United States Patent
Back et al.

(10) Patent No.: US 7,508,764 B2
(45) Date of Patent: Mar. 24, 2009

(54) PACKET FLOW BIFURCATION AND ANALYSIS

(75) Inventors: Jonathan Back, Vancouver (CA); Siegfried Johannes Luft, Vancouver (CA)

(73) Assignee: Zeugma Systems Inc., Richmond (CA)

( * ) Notice: Subject to any disclaimer, the term of this patent is extended or adjusted under 35 U.S.C. 154(b) by 559 days.

(21) Appl. No.: 11/224,201

(22) Filed: Sep. 12, 2005

(65) Prior Publication Data

US 2007/0058632 A1    Mar. 15, 2007

(51) Int. Cl.
   *H04L 12/26* (2006.01)
(52) U.S. Cl. .................. 370/235; 370/252; 370/392
(58) Field of Classification Search .......... 370/229–237
   See application file for complete search history.

(56) References Cited

U.S. PATENT DOCUMENTS

| | | | |
|---|---|---|---|
| 4,720,850 | A | 1/1988 | Oberlander et al. |
| 4,893,302 | A | 1/1990 | Hemmady et al. |
| 6,262,974 | B1 | 7/2001 | Chevalier et al. |
| 6,320,863 | B1 | 11/2001 | Ramfelt |
| 6,587,470 | B1 | 7/2003 | Elliot et al. |
| 6,608,832 | B2 | 8/2003 | Forslow |
| 6,678,281 | B1 | 1/2004 | Chakrabarti et al. |
| 6,741,595 | B2 | 5/2004 | Maher et al. |
| 6,779,030 | B1 | 8/2004 | Dugan et al. |
| 6,789,116 | B1 | 9/2004 | Sarkissian et al. |
| 6,873,600 | B1 * | 3/2005 | Duffield et al. ............. 370/252 |
| 6,948,003 | B1 | 9/2005 | Newman et al. |
| 6,961,539 | B2 | 11/2005 | Schweinhart et al. |
| 6,985,431 | B1 * | 1/2006 | Bass et al. .................... 1/1 |
| 7,002,977 | B1 | 2/2006 | Jogalekar |
| 7,257,616 | B2 * | 8/2007 | Bass et al. .................. 709/203 |
| 2002/0016860 | A1 | 2/2002 | Garcia-Luna-Aceves et al. |
| 2002/0036983 | A1 | 3/2002 | Widegren et al. |
| 2002/0107908 | A1 | 8/2002 | Dharanikota |

(Continued)

FOREIGN PATENT DOCUMENTS

CA    1 295 391    2/1992

(Continued)

OTHER PUBLICATIONS

PCT/CA2006/001414, PCT International Search Report and Written Opinion, Dec. 19, 2006.

(Continued)

*Primary Examiner*—Michael J Moore, Jr.
(74) *Attorney, Agent, or Firm*—Blakely Sokoloff Taylor & Zafman LLP

(57) ABSTRACT

Methods and apparatus for optimum matching of a traffic profile with an individual traffic flow using flow bifurcation and analysis. Bifurcation and duplication of packets that make up a flow received at an ingress element are forwarded to each of egress traffic and computation processor resources, such that egress traffic operations and traffic analysis operations may be performed concurrently without introducing jitter or delay in either bifurcated processing path. The traffic analysis includes maintaining flow statistics, flow stateful information and classifying the flow as a particular application traffic type. The optimum traffic profile for this application traffic type is then selected and applied to the individual flow. The traffic analysis data is forwarded to ingress and egress processing elements in real time, and ingress and egress traffic processing operations are dynamically adjusted in view of the traffic analysis data.

30 Claims, 14 Drawing Sheets

U.S. PATENT DOCUMENTS

| | | | |
|---|---|---|---|
| 2002/0116521 A1 | 8/2002 | Paul et al. | |
| 2002/0181462 A1 | 12/2002 | Surdila et al. | |
| 2003/0067903 A1 | 4/2003 | Jorgensen | |
| 2003/0108015 A1 | 6/2003 | Li | |
| 2003/0118029 A1 | 6/2003 | Maher et al. | |
| 2004/0013089 A1 | 1/2004 | Taneja et al. | |
| 2004/0028051 A1 | 2/2004 | Etemadi et al. | |
| 2004/0248583 A1 | 12/2004 | Satt et al. | |
| 2005/0041584 A1 | 2/2005 | Lau et al. | |
| 2005/0068722 A1 | 3/2005 | Wei | |
| 2006/0028982 A1 | 2/2006 | Wright | |
| 2006/0101159 A1* | 5/2006 | Yeh et al. | 709/246 |
| 2006/0140119 A1 | 6/2006 | Yeh et al. | |
| 2006/0140128 A1* | 6/2006 | Chi et al. | 370/241 |
| 2006/0149841 A1 | 7/2006 | Strub | |

FOREIGN PATENT DOCUMENTS

| | | |
|---|---|---|
| CA | 2 276 526 A1 | 7/1998 |
| CA | 2 511 997 A1 | 8/2004 |
| WO | WO 99/30460 | 6/1999 |
| WO | WO 03/094449 A1 | 11/2003 |
| WO | WO2005/017707 A2 | 2/2005 |

OTHER PUBLICATIONS

PCT/CA2006/001423, PCT International Search Report and Written Opinion, Dec. 18, 2006.
PCT/CA2006/001469, PCT International Search Report and Written Opinion, Dec. 28, 2006.
"Delivering Video over IP," Microsoft Corporation, 2003.
"What Is Unicast IPv4 Routing?" Microsoft TechNet, Microsoft Corporation, Mar. 28, 2003, pp. 1-6.
"How IPv4 Multicasting Works," Microsoft TechNet, Microsoft Corporation, Mar. 28, 2003, pp. 1-32.
"How Unicast IPv4 Routing Protocols and Services Work," Microsoft TechNet, Microsoft Corporation, Mar. 28, 2003, pp. 1-60.
PCT/CA2006/000555, PCT International Search Report and Written Opinion, Jul. 26, 2006.
PCT/CA2006/000554, PCT International Search Report and Written Opinion, Aug. 1, 2006.
Bodin, U., et al., "End-to-End QoS control architectures from a wholesale and retail perspective: benefits and challenges." [retrieved Apr. 19, 2007]. Retrieved from the Internet: www.operax.com, Operax, Tegeluddsvägen 92, SE-115 28, Stockholm, Sweden.
Gallon, C., et al., MSF Technical Report, MSF-TR-ARCH-005-FINAL. "Bandwidth Management in Next Generation Packet Networks." MultiService Forum. Aug. 2005. [retrieved Apr. 19, 2007]. Retrieved from the Internet: <URL: http://www.msforum.org/techinfo/reports/MSF-TR-ARCH-005-FINAL.pdf>.
Jungck, Peder, "Open Network Services Platforms for High-Value Network Services", [online], 2004 [retrieved Feb. 28, 2007]. Retrieved from the Internet: CloudShield Technologies, Inc., www.cloudshield.com. CloudShield, 212 Gibraltar Drive, Sunnyvale, California 94089.
"Administrator, Developer and Partner Training Courses." [online] CloudShield Technologies, Inc., 2006 [retrieved Feb. 28, 2007]. Retrieved from the Internet: <URL: http://www.cloudshield.com/pdfs/training_course_Descriptions.pdf>.
"Arbor Peakflow SP on CS-2000: CloudShield and Arbor Networks Integrated Solution for DDoS Control." [retrieved Feb. 28, 2007]. Retrieved from the Internet: CloudShield Technologies, Inc., www.cloudshield.com. CloudShield, 212 Gibraltar Drive, Sunnyvale, California 94089. 2005.
"Bandwidth-on-Demand Solution." [retrieved Apr. 19, 2007]. Retrieved from the Internet: www.operax.com. Operax, Tegeluddsvägen 92, SE-115 28, Stockholm, Sweden. 2005.
"Broadband Architectures to Go Above and Beyond Triple Play." [retrieved Feb. 28, 2007]. Retrieved from the Internet: www.operax.com. Operax, Tegeluddsvägen 92, SE-115 28, Stockholm, Sweden. Sep. 2005.

"CloudShield Content Control Suite: Modular Software for Implementing Multi-Function Service Control." [retrieved Feb. 28, 2007]. Retrieved from the Internet: CloudShield Technologies, Inc., www.cloudshield.com, CloudShield, 212 Gibraltar Drive, Sunnyvale, California 94089. 2006.
"CloudShield Network Observatory: CS-2000 with 3rd Party Applications Bring Network Content Into Focus." [retrieved Feb. 28, 2007]. Retrieved from the Internet: CloudShield Technologies, Inc., www.cloudshield.com. CloudShield, 212 Gibraltar Drive, Sunnyvale, California 94089. 2005.
"CloudShield PacketWorks IDE: Developers' Toolkit for CS-2000 In-Network Computing Platform." [retrieved Feb. 28, 2007]. Retrieved from the Internet: CloudShield Technologies, Inc., www.cloudshield.com. CloudShield, 212 Gibraltar Drive, Sunnyvale, California 94089. 2005.
"CS-2000 Content Processing Platform: Multi-Function Systems for Controlling and Securing Next Generation Services." [retrieved Feb. 28, 2007]. Retrieved from the Internet: CloudShield Technologies, Inc., www.cloudshield.com, CloudShield, 212 Gibraltar Drive, Sunnyvale, California 94089. 2006.
"Efficient Network Resource Control—A Source of Competitive Advantage." [retrieved Apr. 19, 2007]. Retrieved from the Internet: www.operax.com. Operax, Tegeluddsvägen 92, SE-115 28, Stockholm, Sweden. Sep. 2005.
"Ellacoya Introduces VoIP Quality Reporter (VQR)." [online] Ellacoya Networks, Inc., [retrieved Apr. 19, 2007] Retrieved from the Internet: <URL: http://www.ellacoya.com/products/vqr.shtml>.
"Ellacoya Multimedia Service Manager (MSM) PacketCable Multimedia-based Application." [online] Ellacoya Networks, Inc., [retrieved Apr. 19, 2007] Retrieved from the Internet: <URL: http://www.ellacoya.com/products/multimediaMgr.shtml>.
"Ellacoya's Scalable Distributed Architecture." [online] Ellacoya Networks, Inc., [retrieved Apr. 19, 2007] Retrieved from the Internet: <URL: http://www.ellacoya.com/products/architecture.shtml>.
"Guarantee QoS for IPTV with Operax Bandwidth Manager." [retrieved Apr. 19, 2007]. Retrieved from the Internet: www.operax.com. Operax, Tegeluddsvägen 92, SE-115 28, Stockholm, Sweden. 2006.
"How IPv4 Mutlicasting Works," Microsoft TechNet, Microsoft Corporation, Mar. 28, 2003, pp. 1-32.
"How Unicast Ipv4 Routing Protocols and Services Work," Microsoft TechNet, Microsoft Corporation, Mar. 28, 2003, pp. 1-60.
"IMS and Operax Bandwidth Manager—Guaranteed QoS." [retrieved Apr. 19, 2007]. Retrieved from the Internet: www.operax.com. Operax, Tegeluddsvägen 92, SE-115 28, Stockholm, Sweden. 2006.
"Integrating Applications with the CloudShield ONSP." [retrieved Feb. 28, 2007]. Retrived from the Internet: CloudShield Technologies, Inc., www.cloudshiled.com, CloudShield, 212 Gibraltar Drive, Sunnyvale, California 94089. Aug. 2004.
"Integrated Content Control for An All IP World." [retrieved Feb. 28, 2007]. Retrieved from the Internet: CloudShield Technologies, Inc., www.cloudshiled.com. CloudShield, 212 Gibraltar Drive, Sunnyvale, California 94089.
"IP Service Control System." [retrieved Apr. 19, 2007] Retrieved from the Internet: Ellacoya Networks, Inc., www.ellacoya.com. Ellacoya Networks, 7 Henry Clay Drive, Merrimack, NH 03054 USA. 2005.
"Managed DDoS Security Services: An Arbor Networks/CloudShield Solution." [retrived Feb. 28, 2007]. Retrived from the Internet: CloudShield Technologies, Inc., www.cloudshield.com. CloudShield, 212 Gibraltar Drive, Sunnyvale, California 94089. Aug. 2004.
"Meeting the Multi-Service IP QoS Challenges." [retrieved Apr. 19, 2007]. Retrieved from the Internet: www.operax.com. Operax, Tegeluddsvägen 92, SE-115 28, Stockholm, Sweden.
"On the Road to IP Multi-Service." [retrieved Apr. 19, 2007]. Retrieved from the Internet: www.operax.com. Operax, Tegeluddsvägen 92, SE-115 28, Stockholm, Sweden.
"Operax Bandwidth Manager 5500: QoS control for the access, aggregation and edge." [retrieved Apr. 19, 2007]. Retrieved from the Internet: www.operax.com. Operax, Tegeluddsvägen 92, SE-115 28, Stockholm, Sweden. 2006.

"Operax Bandwidth Manager 5700: QoS control for IP/MPLS Networks." [retrieved Apr. 19, 2007]. Retrieved from the Internet: www.operax.com. Operax, Tegeluddsvägen 92, SE-115 28, Stockholm, Sweden. 2006.

"Operax guarantees QoS for Video Telephony: QoS guaranteed value added services." [retrieved Apr. 19, 2007]. Retrieved from the Internet: www.operax.com. Operax, Tegeluddsvägen 92, SE-115 28, Stockholm, Sweden. 2005.

"Operax in IP Multimedia Subsystem (IMS): Advanced QoS control for IMS/NGN." [retrieved Apr. 19, 2007]. Retrieved from the Internet: www.operax.com. Operax, Tegeluddsvägen 92, SE-115 28, Stockholm, Sweden. 2006.

"Operax Triple Play: Service Control System." [retrieved Apr. 19, 2007]. Retrieved from the Internet: www.operax.com. Operax, Tegeluddsvägen 92, SE-115 28, Stockholm, Sweden. 2005.

"Prolexic DNS Shield on CS-2000: Prolexic and CloudShield Integrated Solution for DNS Service Protection." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"A Unified Policy Management Framework: IP Service Creation and Assurance in Converged Networks." [retrieved Apr. 19, 2007]. Retrieved from the Internet: www.operax.com. Operax, Tegeluddsvägen 92, SE-115 28, Stockholm, Sweden. Nov. 2006.

"What is Unicast IPv4 Routing?" Microsoft TechNet, Microsoft Corporation, Mar. 28, 2003, pp. 1-6.

PCT/CA2006/000555, PCT International Search Report and Written Opinion, Jul. 26, 2006.

PCT/CA2006/000554, PCT International Search Report and Written Opinion, Aug. 1, 2006.

PCT/CA2006/001414, PCT International Search Report and Written Opinion, Dec. 19, 2006.

PCT/CA2006/001423, PCT International Search Report and Written Opinion, Dec. 18, 2006.

PCT/CA/2006/001469, PCT International Search Report and Written Opinion, Dec. 28, 2006.

* cited by examiner

PACKET FLOW BIFURCATION AND ANALYSIS

FIELD OF THE INVENTION

The field of invention relates generally to congestion and flow control in converged full service communication systems, and, more specifically but not exclusively relates to applying quality of service profiles in real time groups of traffic flows.

BACKGROUND INFORMATION

As depicted in FIG. 1, a modern metro area network 100 is composed of two types of networks: a core network 102 and one of more access networks 106. The core network 102 communicates data traffic from one or more service providers 104A-104N in order to provide services to one or more subscribers 108A-108M. Services supported by the core network 102 include, but are not limited to, (1) a branded service, such as a Voice over Internet Protocol (VoIP), from a branded service provider; (2) a licensed service, such as Video on Demand (VoD), through a licensed service provider and (3) traditional Internet access through an Internet Service Provider (ISP).

The core network supports a variety of protocols (Synchronous Optical Networking (SONET), Internet Protocol (IP), Packet over SONET (POS), Dense Wave Division Multiplexing (DWDM), OSPF, BGP, ISIS, etc.) using various types of equipment (core routers, SONET add-drop multiplexers (ADM), DWDM equipment, etc.). Furthermore, the core network communicates data traffic from the service providers 104A-104N to access network(s) 106 across link(s) 112. In general, link(s) 112 may be a single optical, copper or wireless link or may comprise several such optical, copper or wireless link(s).

On the other hand, the access network(s) 106 complements the core network 102 by aggregating the data traffic from the subscribers 108A-108M. Access network(s) 106 may support data traffic to and from a variety of types of subscribers 108A-108M, (e.g. residential; corporate, mobile, wireless, etc.). Although the access network(s) 106 may not comprise of each of the types of subscriber (residential, corporate, mobile, etc), access(s) network 106 will comprise at least one subscriber. Typically, access network(s) 106 supports thousands of subscribers 108A-108M. Access network(s) 106 aggregates data traffic from the subscribers over link(s) 112 connecting to the core network 102. Access networks support a variety of protocols (e.g., IP, Asynchronous Transfer Mode (ATM), Frame Relay, Ethernet, Digital Subscriber Line (DSL), Dynamic Host Configuration Protocol (DHCP), Point-to-Point Protocol (PPP), Point-to-Point Protocol over Ethernet (PPPoE), etc.) using various types of equipment (Edge router, Broadband Remote Access Servers (BRAS), Digital Subscriber Line Access Multiplexers (DSLAM), Switches, etc). The access network(s) 106 uses subscriber policy manager(s) 110 to set policies for individual ones and/or groups of subscribers. Policies stored in a subscriber policy manager(s) 110 allow subscribers access to different ones of the service providers 104A-N. Examples of subscriber policies are bandwidth limitations, traffic flow characteristics, amount of data, allowable services, etc.

Before discussing subscriber policies and the effect on services, it is worth noting that data traffic is transmitted in data packets. A data packet (also known as a "packet") is a block of user data with necessary address and administration information attached, usually in a packet header and/or footer, which allows the data network to deliver the data packet to the correct destination. Examples of data packets include, but are not limited to, IP packets, ATM cells, Ethernet frames, SONET frames and Frame Relay packets. Typically, data packets having similar characteristics are transmitted in a flow at a transmission rate. The transmission rate is determined by the packet size and the transmission gap (or "inter-packet gap") between each packet. In addition, the transmission rate of data packets is dependent on the capacity of the network connection and processor capability of the transmitting device.

FIG. 2 represents the Open Systems Interconnect (OSI) model of a layered protocol stack for transmitting data packets 200. Each layer installs its own header in the data packet being transmitted to control the packet through the network. The physical layer (layer 1) 202 is used for the physical signaling. The next layer, data link layer (layer 2) 204, enables transferring of data between network entities. The network layer (layer 3) 206 contains information for transferring variable length data packet between one or more networks. For example, IP addresses are contained in the network layer 206, which allows network devices (also commonly referred to a network elements) to route the data packet. Layer 4, the transport layer 208, provides transparent data transfer between end users. The session layer (layer 5) 210, provides the mechanism for managing the dialogue between end-user applications. The presentation layer (layer 6) 212 provides independence from difference in data representation (e.g. encryption, data encoding, etc.). The final layer is the application layer (layer 7) 212, which contains the actual data used by the application sending or receiving the packet. While most protocol stacks do not exactly follow the OSI model, it is commonly used to describe networks.

Returning to FIG. 1, bandwidth sensitive services, such as VoIP or VoD, require a dedicated bandwidth over link(s) 112 to properly operate. However, because each access network 106 can support thousands of subscribers, link(s) 112 can get overloaded and not provide enough bandwidth for these bandwidth sensitive services. Subsequently, the quality of these services degrades or becomes interrupted altogether. One solution to this problem is to enforce a Quality of Service (QoS) from the core 102 and/or access 106 networks. QoS allocates different bandwidth rates to different types of data traffic. For example, QoS can be set up to allocate a bandwidth of 20 Mbps for VoIP service over link(s) 112. In addition, QoS shapes the data traffic by re-transmitting the data traffic in a constant rate. However, for QoS to work properly, both the core and access networks must be set up to support the desired QoS policy.

Devices that solely perform QoS can be categorized, but not limited to, either traffic shapers or flow switches. A traffic shaper is a device that classifies a packet by deep packet inspection and transmits the packet based on pre-determined subscriber policies. Turning to FIG. 2, deep packet inspection examines the data contained in layers up to and including application layer 214 of each data packet 200 to determine what quality of service should be used for the packet. For example and by way of illustration, deep packet inspection matches the structure of the application layer data with potentially hundreds of known application data types. This allows a traffic shaper to finely tune the quality of service enforced. For instance, a traffic shaper may identify control packets for an adaptable video conferencing protocol to configure the network for an optimal video conferencing rate.

Although existing traffic shapers are subscriber aware, these traffic shapers only enforce pre-determined subscriber policies. That is, subscribers policies are set by the operator of the traffic shaper and do not change until the operator modifies the subscriber policies. This does not allow subscriber policies to change in real-time based on existing network conditions. Furthermore, existing traffic shapers cannot handle the high volume of data traffic that cross the core 102 and access 116 networks.

On the other hand, flow switches are network devices that transmit data packets in connected flows, instead of discrete packets. Flow switches operate on groups of similar packets to provide QoS for an application. However, flow switches have limited data traffic processing capability, are not subscriber aware, perform limited or no deep packet inspection, and cannot update subscriber policies in real-time.

SUMMARY OF THE INVENTION

In accordance with aspects of the present invention, methods and apparatus are disclosed for optimum matching of traffic profiles with individual traffic flows. This matching of optimum traffic profiles occurs in real time without any static provisioning linking the flow with the profile. The matching is performed by the bifurcation and duplication of packets that make up a flow to each of egress traffic and computation processor resources, such that egress traffic operations and traffic analysis operations may be performed concurrently on the egress traffic and computation processor resources without introducing jitter or delay in either bifurcated processing path. The traffic analysis includes maintaining flow statistics, flow stateful information and classifying the flow as a particular application traffic type. The optimum traffic profile for this application traffic type is then selected and applied to the individual flow. The traffic analysis data is forwarded to ingress and egress processing elements in real time, and ingress and egress traffic processing operations are dynamically adjusted in view of the traffic analysis data.

In another aspect of the present invention, an implementation environment comprising an apparatus for performing the method is disclosed. The apparatus includes a chassis populated with multiple traffic and compute blades. The various blades are enabled to communicate with one another using a backplane mesh interconnect provided by the chassis under management of backplane fabric switches hosted by each blade. Distributed software components are also provided for facilitating the method via execution on associated processing elements on the traffic and compute blades.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for optimum matching of traffic profiles with individual traffic flows. In the following description, numerous specific details such as application subscriber data traffic flow, traffic policy, data packet, line card architectures, software functionality and interrelationships of system components are set forth in order to provide a more thorough understanding of the invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the term "coupled," along with its derivatives, is used. "Coupled" may mean that two or more elements are in direct physical or electrical contact. However, "coupled" may also mean that two or more elements are not in direct contact with each other, but yet still co-operate or interact with each other.

Exemplary embodiments of the invention will now be described with reference to FIGS. 3-18. In particular, the operations of the flow diagrams in FIGS. 5, 16, and 18 will be described with reference to the exemplary architecture embodiments of FIGS. 4, 6-15, and 17. However, it should be understood that the operations of these flow diagrams can be performed by embodiments of the invention other than those discussed with reference to FIGS. 4, 6-15, and 17, and that the embodiments discussed with reference to FIGS. 5, 16, and 18 can perform operations different than those discussed with reference to these flow diagrams.

Exemplary Traffic Shaping Service Node

Figure 1:
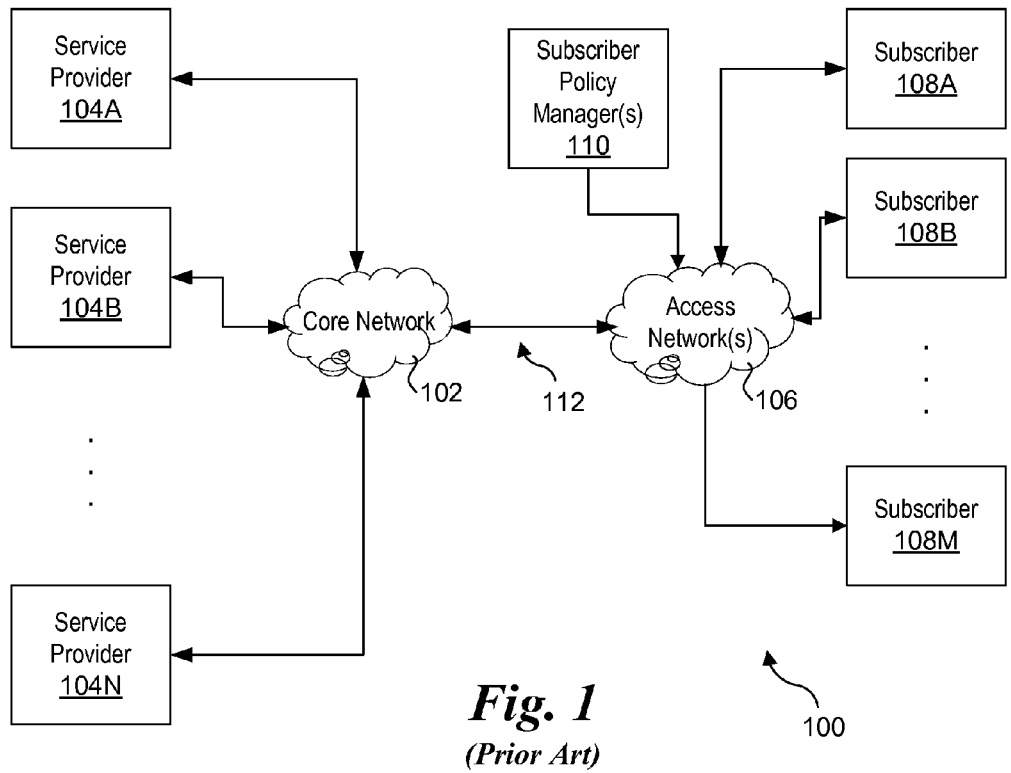
FIG. 1 (Prior Art) illustrates a typical metro area network configuration.
Figure 2:
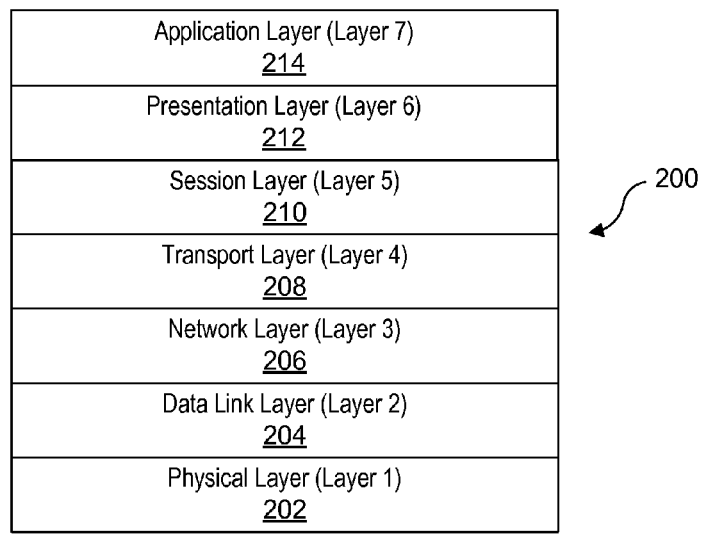
FIG. 2 (Prior Art) is a block diagram illustrating layers of the OSI protocol stack.
Figure 3:
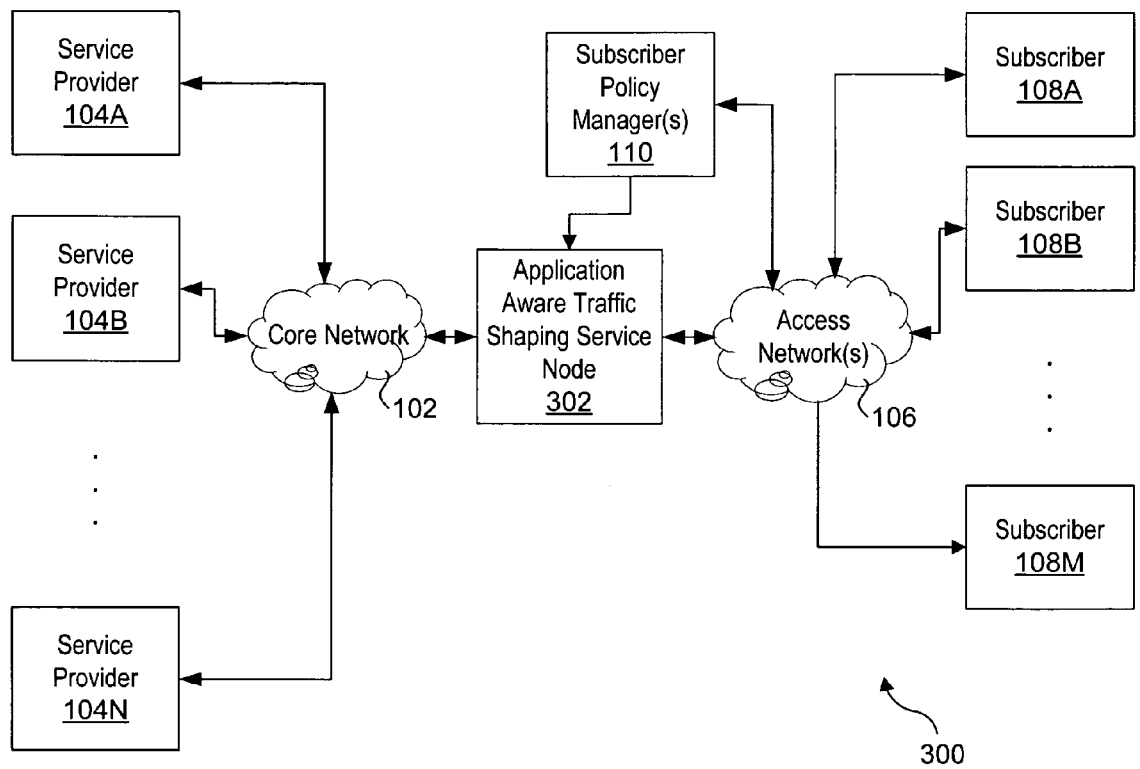
FIG. 3 illustrates an exemplary network configuration using a traffic shaping service node in a metro area network, according to one embodiment of the invention.

FIG. 3 illustrates an exemplary network configuration using a traffic shaping service node 302 in a metro area network according to one embodiment of the invention. (For simplicity and convenience, the terminology "traffic shaping service node" and "service node" are alternatively used herein.) In FIG. 3, traffic shaping service node 302 is communicatively coupled between the core 102 and access 106 networks. While one embodiment is described under which the traffic shaping service node may shape traffic traveling in either direction, alternative embodiments may shape in only one direction (e.g., the service provider data traffic coming from the core network 102. Traffic shaping, a form of QoS, is the process of regulating and smoothing the flow of network data traffic within a computer network. Restricting the bandwidth of the traffic flow is one way to regulate data traffic. There are a variety of ways to bring data traffic flow with a desired rate, including dropping or discarding data packets, buffering received data packets and re-transmitting the data packets at the desired rate, combinations of these (e.g., buffering packets when there is space in the buffer and dropping packets when there is not), etc. Buffering the data traffic flow allows the traffic shaping service node to smooth the data traffic flow. Smoothing removes the bursts of data traffic and shapes the data traffic into a constant flow of data traffic. Smoothing is advantageous for applications that depend on a constant flow of data traffic. For example, video-based applications, such VoD or video conferencing, or real-time voice applications (VoIP) benefit from a constant flow of data traffic. In general, the traffic shaping service node 302 uses the subscriber policies contained in subscriber policy manager(s) 110 for instruction on how to shape the data traffic from service providers 104A-104N and/or subscribers 108A-108M accordingly. Further details of various elements of embodiments of traffic shaping service nodes are discussed below.

Packet Flow Bifurcation and Analysis

In accordance with further aspects of the invention, techniques are provided to enable optimum matching of a traffic profile with an individual traffic flow. This matching of the optimum traffic profile occurs in real time without any static provisioning linking the flow with the profile. The matching is achieved by the bifurcation and duplication of all packets (i.e., packet data) that make up a flow to a computation resource that will analyze the packets, maintain flow statistics, flow stateful information and classify the flow as a particular application traffic type. The optimum traffic profile for this application traffic type is then selected and applied to the individual flow in real time.

In general, a Traffic Flow comprises a set of packets having similar flow classification parameters. For example, a typical ingress operation performed by a layer-4 router or the like is to classify received packets to associated flows using a rule-based packet classification scheme, such as defined by an Access Control List (ACL) database. Traditionally, the rules for classifying a message (i.e., one or more associated packets) are called filters (or rules in firewall terminology), and the packet classification problem is to determine the lowest cost matching filter or rule for each incoming message at the network element. Under the well-known N-tuple classification scheme, the relevant information is contained in N distinct header fields (or partial header fields) in each packet. For instance, under the common 5-Tuple classification scheme, the relevant fields for an IPv4 packet comprise the Destination Address (32 bits), the Source Address (32 bits), the Destination Port (16 bits), the Source Port (16 bits), and the Protocol Field (8 bits); the set of field values for a given packet is referred to as the 5-Tuple signature.

The corresponding filter database consists of a finite set of filters, $filt_1$, $filt_2$ ... $filt_N$. Each filter is a combination of N values, one for each header field. Each field in a filter is allowed three kinds of matches: exact match, prefix match, or range match and wildcard. In an exact match, the header field of the packet should exactly match the filter field. In a prefix match, the filter field should be a prefix of the header field. In a range match, the header values should like in the range specified by the filter. Each filter $filt_i$ has an associated directive $disp_i$, which specifies how to process a packet matching the filter.

An Application Flow is a flow of packets that carries traffic belonging to a specific application, such as VoIP or VoD. In some cases, the data carried in the packet header (e.g., the 5-Tuple signature) is insufficient to classify a flow as belonging to an application. In this case, data in the packet payload is employed for identifying the appropriate application. To accomplish this function, a technique known as Deep Packet Inspection is required to further analyze the contents of the packet and to keep stateful context of previous packets seen in the flow.

Modern network equipment can typically support 5-Tuple classification at line speed rates. However, classification schemes that employ deep packet inspection may not be implemented at line rate speeds in many instances. As a result, separate processing paths, respectively referred to as fast path and slow path, are sometimes typically employed for performing 5-Tuple classification and deep packet inspection on a given network device.

Figure 4:
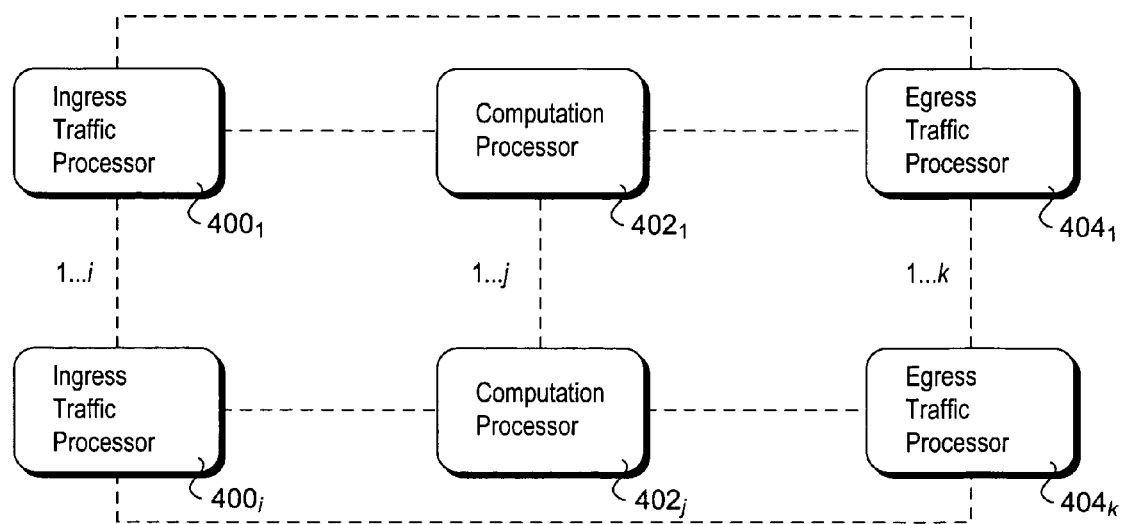
FIG. 4 is a diagram illustrating sets of Ingress Traffic Processors, Computation Processors, and Egress Traffic Processors used to implement aspects of the invention.
Figure 5:
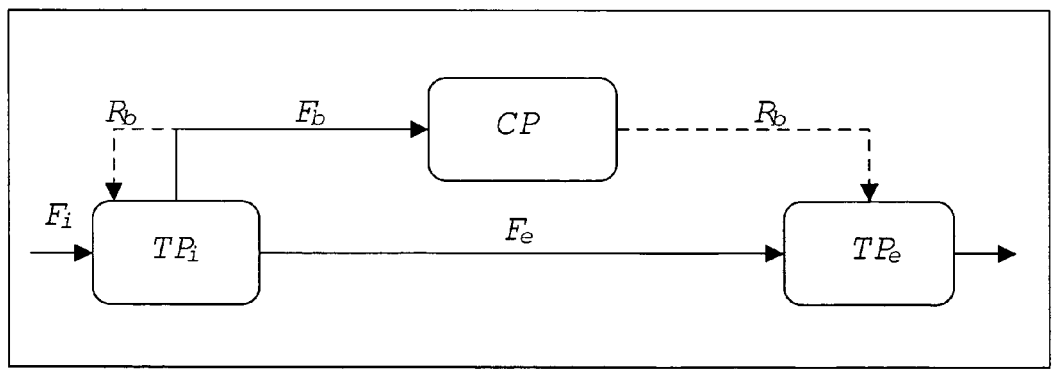
FIG. 5 is a diagram of a feed-forward control loop illustrating aspects of the invention employed via bifurcation of packet flows.

Various high-level aspects of the bifurcated and flow analysis techniques of the present invention are illustrated by way of example in FIGS. 4 and 5. As shown in the architecture diagram of FIG. 4, an apparatus via which the techniques may be implemented includes various processor resources, including multiple ingress traffic processors 400 (depicted as i ingress traffic processors $400_{1-i}$), computation processors 402 (depicted as j computation processors $402_{1-j}$), and egress traffic processors 404 (depicted as k egress traffic processors $402_{1-k}$). In general, the particular values for i, j, and k may be the same or may differ, depending on the particular implementation environment and requirements. The various ingress traffic processors $400_{1-i}$, computation processors $402_{1-j}$, and egress traffic processors $402_{1-k}$ are interconnected in a mesh fashion such that any processor may communicate with any other processor. In one embodiment, the communication rates amongst the various processors are equal. In other embodiments, the communication rates may differ. In one embodiment, the traffic processors perform 5-Tuple classification of flows, while the computation processors perform deep packet inspection of the flows and maintain stateful analysis data pertaining to each flow.

With reference to FIG. 5, an Ingress Traffic Processor is termed $TP_i$, an Egress Traffic Processor is termed $TP_e$, the ingress flow is termed $F_i$, and the egress flow is termed $F_e$. Packets enter the apparatus at the $TP_i$. The $TP_i$ identifies a new incoming flow and make a routing decision R ($F_i$) regarding the destination $TP_e$. Packets from the identified flow shall henceforth be sent to the $TP_e$ and exit the apparatus; packets thus flow from $TP_i$ to $TP_e$.

In addition, $F_i$ is bifurcated, and its packets duplicated, to provide an equivalent and simultaneous flow that is sent to one of the many Computation Processors (CP); which CP is selected is decided programmatically and is a function S ($F_i$) of the flow $F_i$, as schematically depicted by the feed forward control loop of FIG. 5. The bifurcated flow is termed $F_b$. When the $F_i$ flow starts, the CP shall be notified of the creation of a new flow, along with the 5-Tuple that accompanies the flow and it shall expect reception of the flow $F_b$. The CP shall route the $F_b$ to specific software Analysis Entities that are capable of analyzing a traffic flow associated with the specific 5-Tuple. This routing to specific analysis entities enables any state or analytical information that has been extracted from the flow to be preserved, meaning that the analysis process has access to past state information and can alter its analysis based upon this information. As the packet flow is bifurcated and duplicated, no additional latency or jitter is introduced into any traffic flow $F_i$ and $F_e$.

The result $R_b$ of the analysis performed in the CP is then passed onto the $TP_e$ and back to the $TP_i$; this enables the $TP_e$ to adjust the shaping performed on $F_e$ and allow the $TP_i$ to adjust the policing performed on $F_i$.

If packet $P_t$ enters the ingress $TP_i$ and is bifurcated as part of the flow $F_b$ to the CP, then the Analysis Engine shall be working on packet $P_t$ producing a result R ($P_t$) that is sent to $TP_e$. The arrival of the result R ($P_t$) at the $TP_e$ will have a certain time delay introduced in relation to the packet $P_t$ that arrived at $TP_e$ as part of the original (non bifurcated) flow $F_e$ such that, as R ($P_t$) arrives at $TP_e$, then the current packet being processed by $TP_e$ shall be $P_{t+\Delta}$.

The result R ($P_t$) is directly used to dynamically modify or adjust the exact traffic profile $PR_{fe}$ being applied to the packets forming the flow $F_e$, and as such, the traffic profile being selected and applied to a packet $P_{t+\Delta}$ shall be based upon the analysis of packet $P_t$:

$$PR_{fe}(P_{t+\Delta}) = R(P_t)_{where\ \Delta \to 0} \quad (1)$$

As the CP is shared between all Traffic Processors and the Analysis Engines can retain state information regarding past and present 5-Tuple flows, the apparatus has the ability to view traffic in terms of Traffic Aggregates. Having access to these Traffic Aggregates and the statistics associated with then allow the Analysis Engines to select a traffic profile different from that which would result from isolated analysis of the traffic flow.

Additionally, services provided over the network will consist of multiple flows, each with their own 5-Tuple signature. The Analysis Engines shall have the ability to draw together and group the information regarding these multiple flows and treat the grouping as a Service Flow. Furthermore, the Analysis Engines have the ability to track the state of a Service Flow and dynamically alter the results being sent to the $TP_i$ and $TP_e$ that servicing the flows the make up the Service Flow.

Exemplary Implementation Environments

FIGS. 4, 6-15, and 17 illustrate exemplary network element architectures that may be used for a variety of purposes, including but not limited to, a traffic shaping service node as previously described. Thus, while for exemplary network element architectures described with reference to FIGS. 4, 6-15, and 17 are described with reference to a traffic shaping service node, it should be understood that these architectures are independent as part of the invention.

Figure 6:
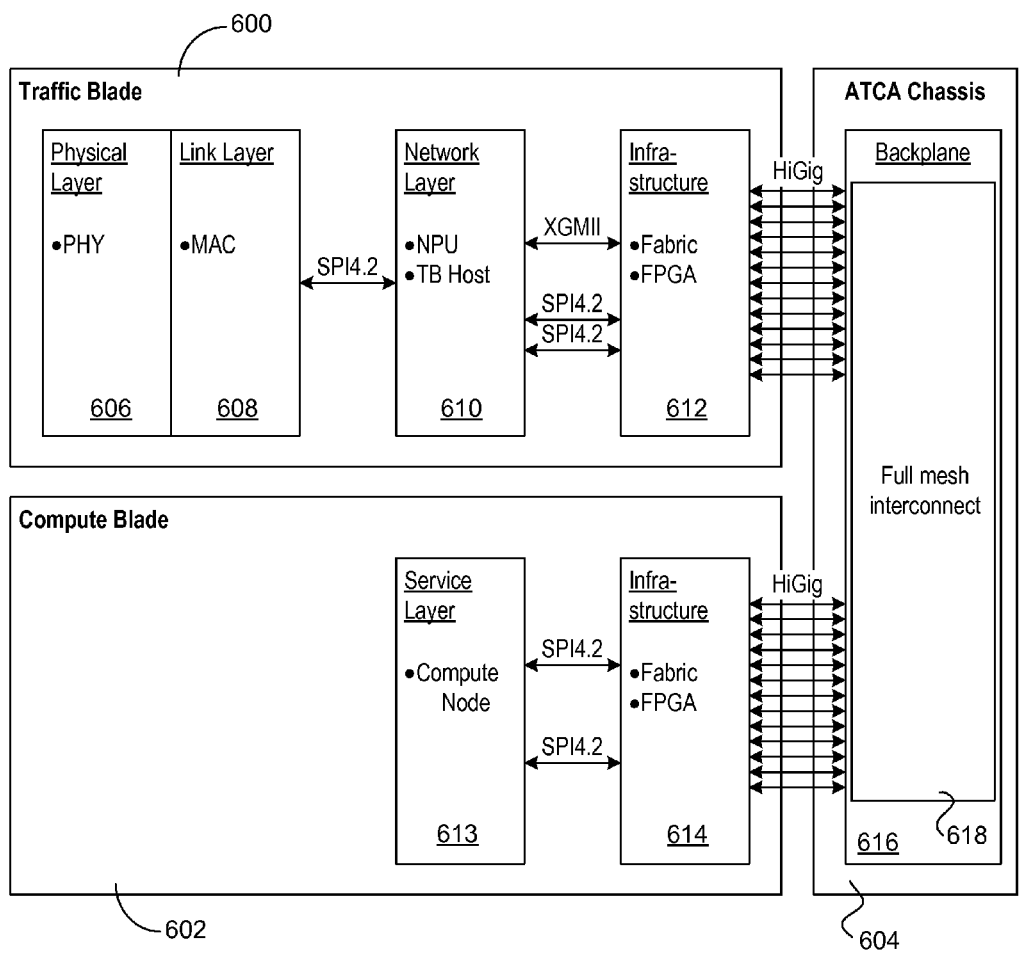
FIG. 6 is a schematic diagram illustrating the communication interconnected between a Traffic Blade and a Compute Blade.

In accordance with architecture aspects of some embodiment, the aforementioned functions are facilitated by various processing and storage resources hosted by associated line cards and the like, which are mounted in a common chassis. As shown in FIG. 6, from a datapath perspective, the hardware architecture of one embodiment of a Service Node can be decomposed into three entities, Traffic Blades (TB) 600, Compute Blades (CB) 602 and the chassis 604. A TB 600 can be further reduced to its physical and link layer portions 606 and 608, network layer components 610, and infrastructure components 612. Similarly, a CB 602 provides Service Layer termination 613 and infrastructure components 614. In one embodiment, a CB can be further re-defined to be an OAMP Blade based on its slot index (within chassis 604). OAMP blades are a functional superset of CBs, adding operations, administration, maintenance and provisioning functionality (collectively referred to as OAMP card function or OAMP CF).

As illustrated in the embodiments herein, chassis 604 comprises an Advanced Telecommunication and Computing Architecture (ATCA or AdvancedTCA®) chassis. The ATCA Chassis provides physical connectivity between the blades via a passive backplane 616 including a full-mesh backplane 616. It is noted that the ATCA environment depicted herein is merely illustrative of one modular board environment in which the principles and teachings of the embodiments of the invention described herein may be applied. In general, similar configurations may be deployed for other standardized and proprietary board environments, including but not limited to blade server environments.

The ATCA 3.0 base specification (approved Dec. 30, 2002), which is being carried out by the PCI Industrial Computer Manufacturers Group (PICMG), defines the physical and electrical characteristics of an off-the-shelf, modular chassis based on switch fabric connections between hot-swappable blades. (As used herein, the terms "board," "blade," and "card," are interchangeable.) This specification defines the frame (rack) and shelf (chassis) form factors, core backplane fabric connectivity, power, cooling, management interfaces, and the electromechanical specification of the ATCA-compliant boards. The electromechanical specification is based on the existing IEC60297 EuroCard form factor, and enables equipment from different vendors to be incorporated in a modular fashion with guaranteed interoperability. The ATCA 3.0 base specification also defines a power budget of 200 Watts (W) per board, enabling high performance servers with multi-processor architectures and multi gigabytes of on-board memory.

In addition to power input to ATCA boards, mating connectors on the boards and backplane are employed for coupling input/output (I/O) signals. Many of the ATCA boards, as well as other modular boards used for telecommunications and computer, such as but not limited to CompactPCI, employ very-high speed I/O channels. For example, Advanced Switching (AS) employs a serial communication channel operating at Gigahertz+ frequencies. ATCA boards may also provide one or more I/O ports on their front panels, enabling an ATCA board to be coupled to other network resources.

Figure 7:
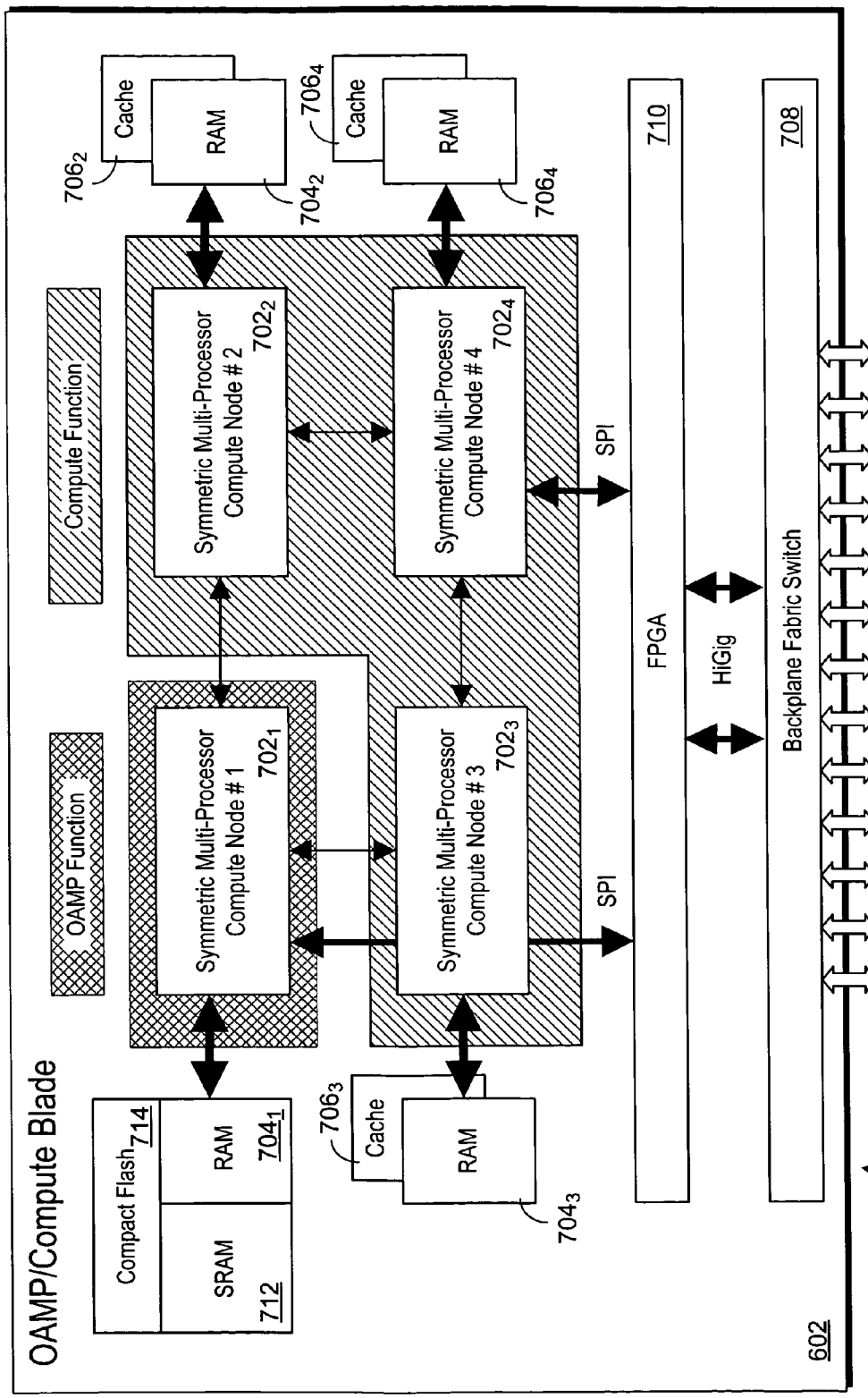
FIG. 7 is a schematic diagram illustrating of one embodiment of a Compute Blade that is provisioned for an OAMP function.

An exemplary architecture 700 for a compute blade 602 is shown in FIG. 7. In one embodiment, a single compute blade (physical) architecture is employed for both Compute Blades and OAMP CF's. More particularly, under architecture 700, a corresponding blade may be deployed to support both Compute Blade and OAMP functionality.

Compute Blade 602 employs four multiple processor compute nodes $702_{1-4}$. In general, each of compute nodes $702_{1-4}$ functions as multiple processor resources, with each processor resource being associated with a logical processor. Accordingly, such processor resources may be implemented using separate processors, or processor chips employing multiple processor cores. For example, in the illustrated embodiment of FIG. 7, each of compute nodes $702_{1-4}$ is implemented via an associated symmetric multi-core processor. Exemplary multi-core processors that may be implemented include, but are not limited to Broadcom 1480 and 1280 devices. Each of the compute nodes $702_{1-4}$ is enabled to communicate with other compute nodes via an appropriate interface (e.g., bus or serial-based interfaces). For the Broadcom 1480 and 1280 devices, this interface comprises a "Hyper Transport" (HT) interface. Other native (standard or proprietary) interfaces between processors may also be employed.

As further depicted in architecture 700, each compute nodes $702_{1-4}$ is allocated various memory resources, including respective RAM $704_{1-4}$. Under various implementations, each of compute nodes $702_{1-4}$ may also be allocated an external cache $706_{1-4}$, or may provide one or more levels of cache on-chip. In one embodiment, the RAM comprises ECC (Error Correction Code) RAM. In one embodiment, each compute node employs a NUMA (Non-Uniform Memory Access) cache coherency scheme. Other cache coherency schemes, such as MESI (Modified, Exclusive, Shared, Invalidated), may also be implemented for other embodiments.

Each Compute Blade 602 includes a means for interfacing with ATCA mesh interconnect 618. In the illustrated embodiment of FIG. 7, this is facilitated by a Backplane Fabric Switch 708. Meanwhile, a field programmable gate array (FPGA) 710 containing appropriate programmed logic is used as an intermediary component to enable each of compute nodes $702_{1-4}$ to access backplane fabric switch 708 using native interfaces for each of the compute nodes and the fabric switch. In the illustrated embodiment, the interface between each of compute nodes $702_{1-4}$ and the FPGA 710 comprises an SPI (System Packet Interface) 4.2 interface, while the interface between the FPGA and backplane fabric switch 708 comprises a Broadcom HiGig™ interface. It is noted that these interfaces are merely exemplary, and that other interface may be employed depending on the native interfaces of the various blade components.

Figure 11:
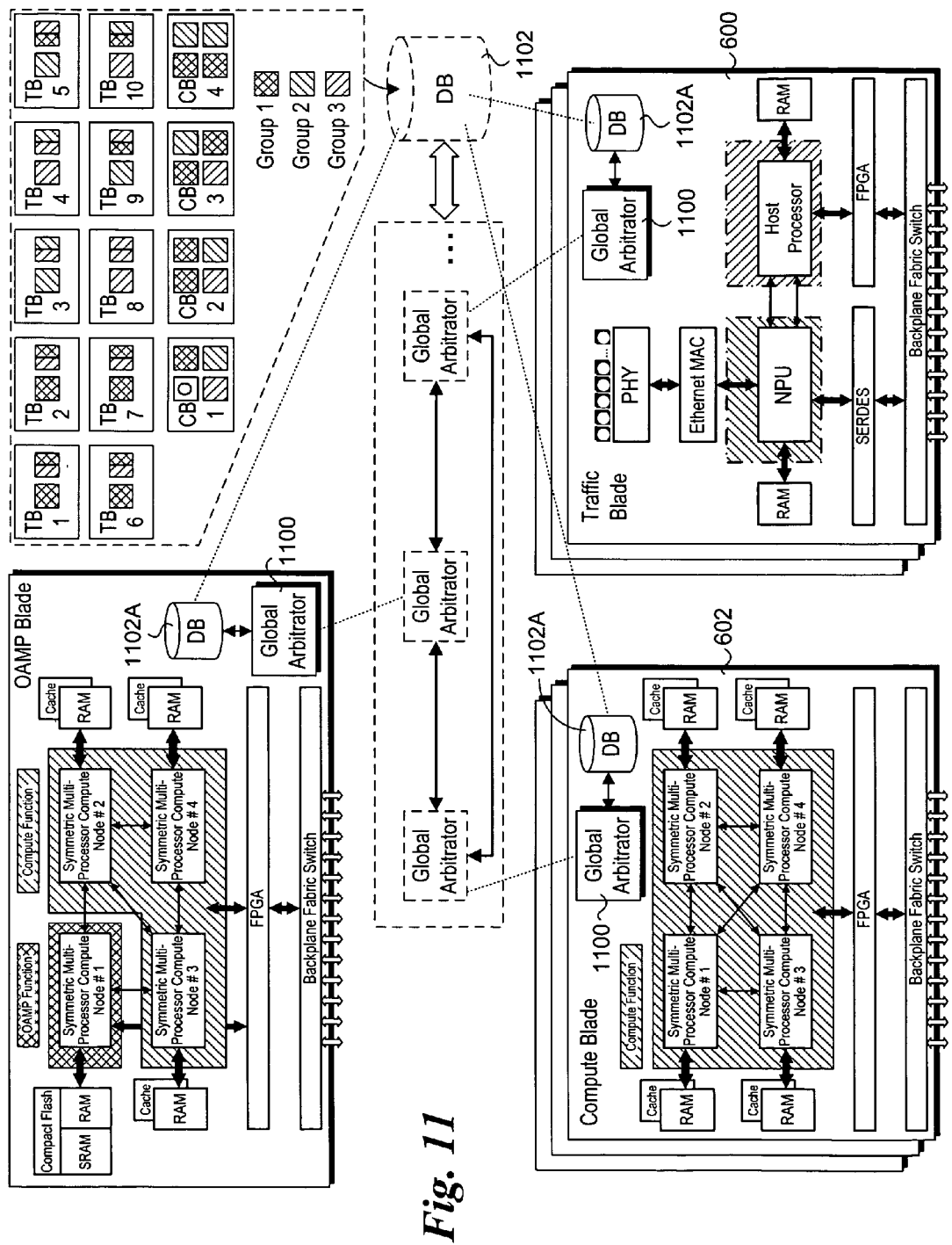
FIG. 11 is a schematic diagram illustrating a service node implementation environment including a local instance of a global arbitrator on each blade.

In addition to local RAM (e.g., RAM $704_1$), the compute node associated with the OAMP function (depicted in FIG. 7 as Compute Node #1) is provided with local SRAM 712 and a non-volatile store (depicted as Compact flash 714). The non-volatile store is used to store persistent data used for the OAMP function, such as provisioning information and logs. In Compute Blades that do not support the OAMP function, each compute node is provided with local RAM and a local cache, as depicted in FIG. 11.

In the embodiment illustrated in FIG. 7, compute blade 602 is provisioned as an OAMP blade. In one configuration (as shown), one of the compute nodes is employed for performing OAMP functions (e.g., compute node $702_1$), while the other three compute nodes (e.g., compute nodes $702_{2-4}$) perform normal compute functions associated with compute blades, as described in further detail below. When a compute blade 602 is provisioned as a compute blade, each of compute nodes $702_{1-4}$ is available for performing the compute functions described herein.

Figure 8:
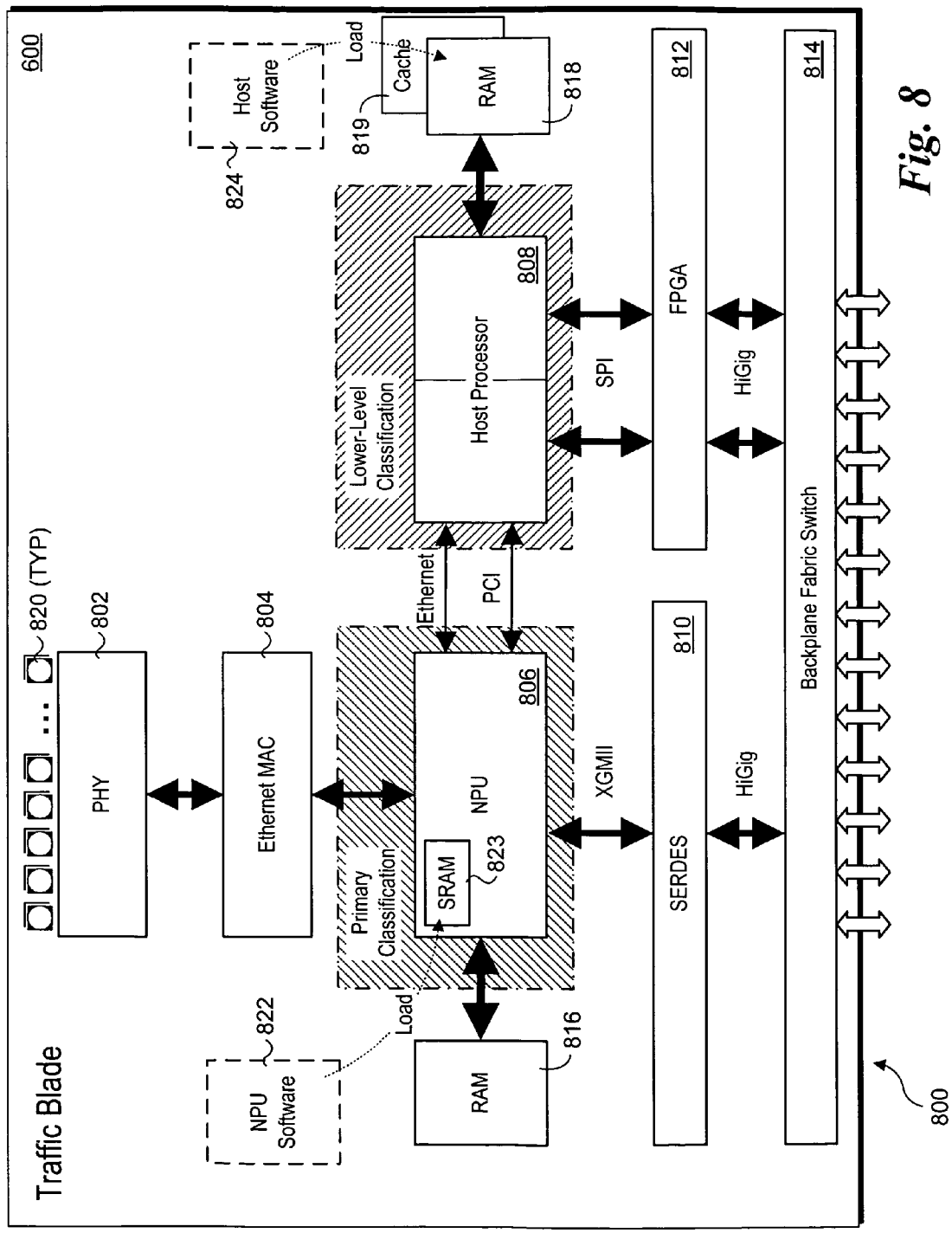
FIG. 8 is a schematic diagram illustrating one embodiment of a Traffic Blade.

FIG. 8 shows an exemplary architecture 800 for a traffic blade 600. Architecture 800 includes a PHY block 802, an Ethernet MAC block 804, a network processor unit (NPU) 806, a host processor 808, a SERDES interface 810, an FPGA 812, a backplane fabric switch 814, RAM 816 and 818 and cache 819. The traffic blade further includes one or more I/O ports 820, which are operatively coupled to PHY block 820. Depending on the particular use, the number of I/O ports may vary from 1 to N ports. For example, under one traffic blade type a 10×1 Gigabit Ethernet (GigE) port configuration is provided, while for another type a 1×10 GigE port configuration is provided. Other port number and speed combinations may also be employed.

PHY block 802 and Ethernet MAC block 804 respectively perform layer 1 (Physical) and layer 2 (Data Link) functions, which are well-known in the art. In general, the PHY and Ethernet MAC functions may be implemented in hardware via separate components or a single component, or may be implemented in a combination of hardware and software via an embedded processor or the like.

One of the operations performed by a traffic blade is packet identification/classification. As discussed above, a multi-level classification hierarchy scheme is implemented for this purpose. Typically, a first level of classification, such as the aforementioned 5-Tuple signature classification scheme, is performed by the traffic blade's NPU 806. Additional classification operations in the classification hierarchy that may be required to fully classify a packet (e.g., identify an application flow type) in the manner discussed above. In general, these higher-level classification operations may be performed by the traffic blade's host processor 808 and/or a processor on a compute blade, depending on the particular classification.

NPU 806 includes various interfaces for communicating with other board components. These include an Ethernet MAC interface, a memory controller (not shown) to access RAM 816, Ethernet and PCI interfaces to communicate with host processor 808, and an XGMII interface. SERDES interface 810 provides the interface between XGMII interface signals and HiGig signals, thus enabling NPU 806 to communicate with backplane fabric switch 814. NPU 806 may also provide additional interfaces to interface with other components, such as an SRAM (Static Random Access Memory) interface unit to interface with off-chip SRAM (both not shown).

Similarly, host processor 808 includes various interfaces for communicating with other board components. These include the aforementioned Ethernet and PCI interfaces to communicate with NPU 806, a memory controller (on-chip or off-chip—not shown) to access RAM 818, and a pair of SPI 4.2 interfaces. FPGA 812 is employed to as an interface between the SPI 4.2 interface signals and the HiGig interface signals.

Typically, NPUs are designed for performing particular tasks in a very efficient manner. These tasks include packet forwarding and packet classification, among other tasks related to packet processing. To support such functionality, NPU 806 executes corresponding NPU software 822. This software is shown in dashed outline to indicate that the software may be stored (persist) on a given traffic blade (e.g., in a flash device or the like), or may be downloaded from an external (to the traffic blade) store during initialization operations, as described below. During run-time execution, NPU software 822 is loaded into internal SRAM 823 provided by NPU 806.

Host processor 808 is employed for various purposes, including lower-level (in the hierarchy) packet classification, gathering and correlation of flow statistics, and application of traffic profiles. Host processor 808 may also be employed for other purposes. In general, host processor 808 will comprise a general-purpose processor or the like, and may include one or more compute cores (as illustrated, in one embodiment a two-core processor is used). As with NPU 806, the functionality performed by host processor is effected via execution of corresponding software (e.g., machine code and or virtual machine byte code), which is depicted as host software 824. As before, this software may already reside on a traffic blade, or be loaded during blade initialization.

In one embodiment, host processor 808 is responsible for initializing and configuring NPU 806. Under one initialization scheme, host processor 808 performs network booting via the DHCP (or BOOTP) protocol. During the network boot process, an operating system is loaded into RAM 818 and is booted. The host processor then configures and initializes NPU 806 via the PCI interface. Once initialized, NPU 806 may execute NPU software 822 on a run-time basis, without the need or use of an operating system.

Figure 9:
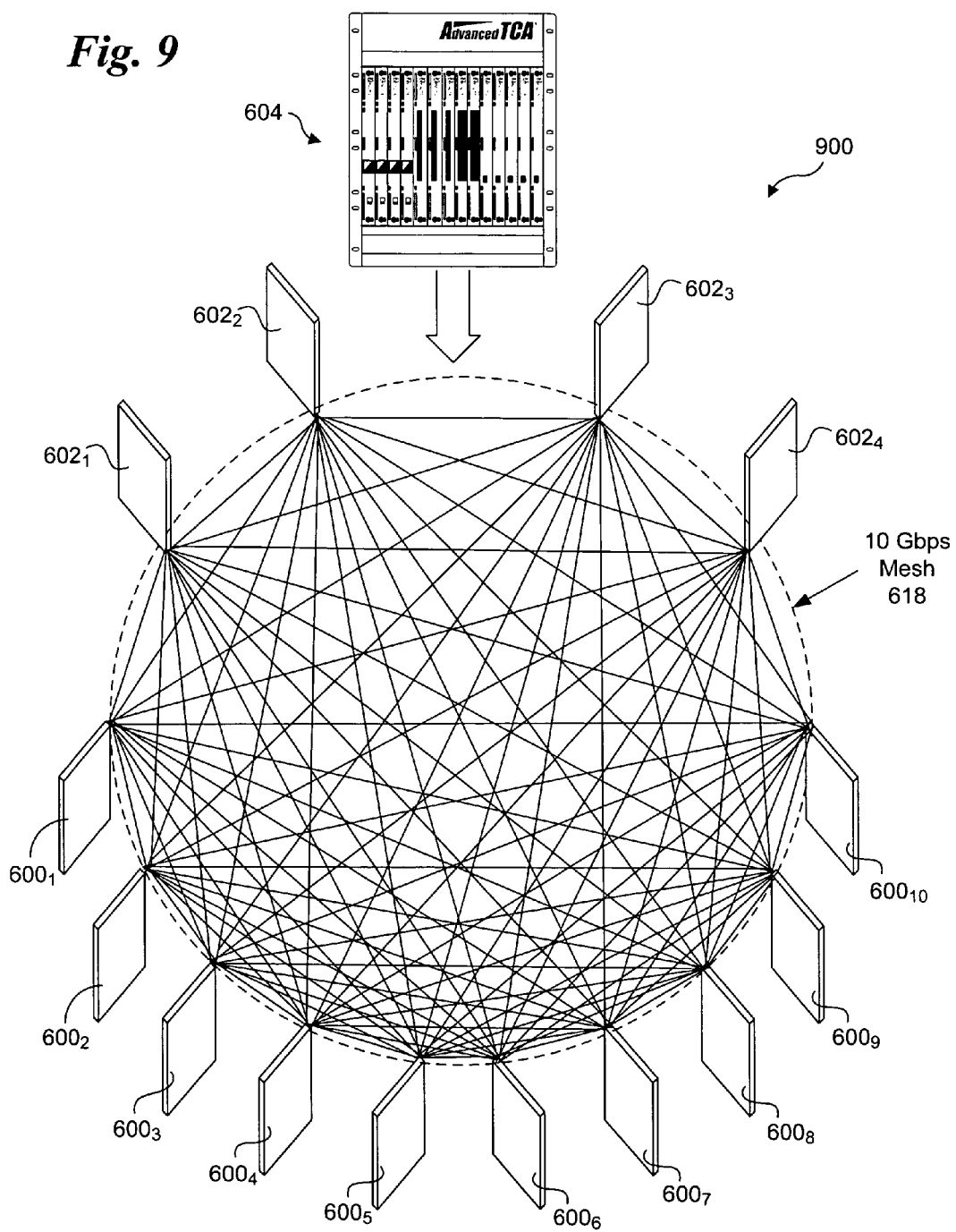
FIG. 9 is a schematic diagram illustrating one configuration of a service node implemented via a ATCA chassis.

FIG. 9 is a schematic diagram illustrating the cross-connectivity provided by the ATCA backplane mesh interconnect used in one embodiment of the Service Node. In the exemplary configuration 900 shown in FIG. 9, an ATCA chassis 604 is fully populated with 14 ATCA blades, with each blade installed in a respective chassis slot—in an actual implementation, the chassis may be populated with less blades or may include other types of blades in addition to compute and traffic blades. The illustrated configuration includes four compute blades $602_{1-4}$, and 10 traffic blades $600_{1-10}$, with one of the compute blades being provisioned to provide OAMP functions. As depicted by the interconnection mesh, each blade is communicatively-coupled with every other blade under the control of fabric switching operations performed by each blade's fabric switch. In one embodiment, mesh interconnect 618 provides a 10 Gbps connection between each pair of blades, with an aggregate bandwidth of 280 Gbps.

Figure 10:
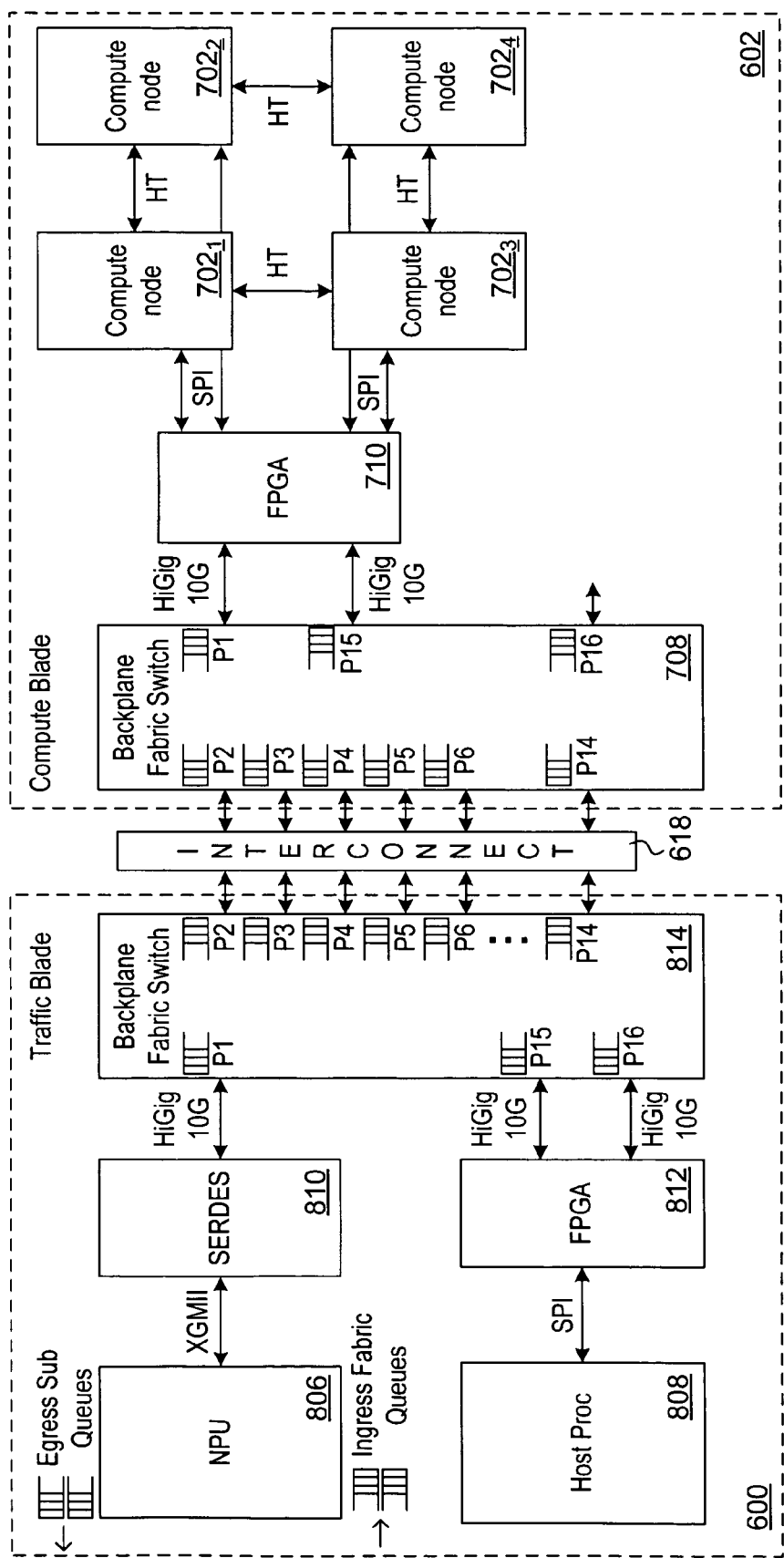
FIG. 10 is a schematic diagram illustrating details of the inter-blade communication scheme; according to one embodiment of the invention.

Further details of the fabric switching operations are shown in FIG. 10, wherein components having like reference numerals to those shown in FIGS. 7 and 8 perform similar functions. Inter-slot connectivity is enabled through a full mesh interconnect network compromising the ATCA passive backplane and a multi-port 10 Gbps switch fabric device integrated on every blade. In one embodiment, a 16-port 10 Gbps HiGig switch (Broadcom proposed model BCM56700) is implemented for each of backplane fabric switches 708 and 814. As an optional configuration, a pair of 8-port switch fabric devices (e.g., Broadcom BCM5675) may be employed in place of the 16-port device shown in FIG. 10. Each fabric switch device maintains chassis facing ports and local facing HiGig ports. Each Traffic Blade 602 fabric present three local facing ports, while each Compute Blade 600 fabric present two local facing ports, with one spare port. The remaining ports are coupled to the backplane mesh, and provide support for a full 14-slot ATCA configuration Architecturally, the switch fabric is a distributed shared memory switch architecture with output port buffering. The fabric is implemented as an insertion ring. Each port provides 128 K bytes of egress packet buffering (principal queue point) and 19 K bytes on ingress packet buffering (sufficient for address resolution and ring insertion delay) for a 9 K byte jumbo frame.

On one embodiment, the switch fabric architecture of FIG. 10 utilizes the fabric to create a partial mesh. That is, full "any-to-any" port forwarding is not required. Specifically, the fabric only needs to forward from local to chassis facing ports (and vice versa) and forwarding between chassis facing ports is not required.

Another aspect of the invention relates to scalability. The service node is implemented using a distributed architecture, wherein various processor and memory resources are distributed across multiple blades. To scale a system, one simply adds another blade. The system is further enabled to dynamically allocate processor tasks, and to automatically perform fail-over operations in response to a blade failure or the like. Furthermore, under an ATCA implementation, blades may be hot-swapped without taking the system down, thus supporting dynamic scaling.

Yet another aspect of the invention relates to dynamic allocation of system resources, such as compute resources, queues, etc. Under this concept, compute resources and usage is monitored on an ongoing basis, and real-time statistics and the like are maintained using a distributed database scheme and a local (to each blade) agent, such that each blade has a "global" view of the entire system resource availability and consumption. Such a scheme is schematically illustrated in FIG. 11, which shows an OAMP Blade 601, multiple Compute Blades 602, and multiple Traffic Blades 600. Each of these blades runs an instance of a software agent or the like (e.g., service, daemon, etc.) referred to as the "Global Arbitrator" 1100. For example, one of the compute nodes on a Compute Blade will be provisioned to run a Global Arbitrator, while the host processor on a Traffic Blade will be used for a similar function. Each of the Global Arbitrator instances are enabled to communicate with one another using a common protocol running over the aforementioned communication signal infrastructure. For example, in one embodiment, Global Arbitrators exchange IP packets to communicate with one another. Other protocols may be implemented in a similar manner.

The Global Arbitrators 1100 are used to perform various tasks. Some task examples include: Distributed Scheduling, Process Management, Group Management, Inter-Process Communication (IPC), and Remote Procedure Calls (RPC). With respect to Distributed Scheduling and Process Management, each Global Arbitrator will maintain local and global resource information for the system. In this case, each Distributed Schedule module for each Global Arbitrator instance will identify the resources on its host blade (e.g., disk, memory, processing, networking, and subscribers), and then propagate this information to the other Global Arbitrators, as illustrated in FIG. 11. The Distributed Schedulers will also be responsible for load balancing resources across blades by tracking local resource loading an propagating this information to other Distributed Schedulers, such that each Global Arbitrator have access to a "world view" of available resources and resource consumption.

To support these tasks, the Global Arbitrators will maintain a distributed database 1102 having a local instance 1102A stored on each blade. The distributed database 1102, which functions as a virtual database, will be maintained in such a manner that if a blade fails, no information will be lost. Each local database instance will store both local and global data.

In accordance with another aspect of the invention, subscribers are associated with groups (based on their Subscriber Profile, such as QoS requirements and other contracted service parameters), while groups, in turn, are associated with resource groups. This is schematically illustrated in FIG. 11. In general, groups may be associated with resources on a blade basis (e.g., Group 1 is associated with Traffic Blades 1, 2, 6, and 7 or with further granularity, such as the individual resource level (e.g., each compute node comprises an individual resource that may be allocated to a given group).

One of the purposes of the Group-to-subscriber mapping pertains to resource allocation. At a first level, the system will attempt to maintain load balancing by allocating resources such that the resources are consumed at a similar level across the infrastructure. At the same time, the subscriber-to-group allocation enables subscribers that have contracted for different levels of services to be allocated a corresponding level of (access to) resources. For example, some groups may be allocated more resources on a per-subscriber basis such that service flows corresponding to subscribers that have purchased a higher level of service will be allocated relatively more resources than service flows corresponding to lower QoS subscribers.

Another software aspect of the system pertains to the use of a Service Management Engine (SME). The SME provides key added value over and above that of a traditional network element such as a BRAS and Edge-Router. A traditional BRAS/Edge-Router is able to manage subscribers' traffic on a per session basis. A service node, equipped with the SME, provides visibility into subscriber sessions, and enable traffic management on a per application level. In addition, it is able to provide customized, network-based, and subscriber-aware application services.

The SME provides these functionalities through flow classification, deep packet inspection, flow level traffic management, and application service scripting. When subscriber traffic enters a service node, it is separated into flows. The flows are classified by their application-level protocols with the aid of deep packet inspection. Some of these flows are traffic-managed according to the authorization of the subscriber to which they belong. This management typically includes policing, shaping and prioritization on a per flow basis. Other flows are bifurcated or diverted to application service scripts that implement various customized services.

As discussed above, the SME builds on the subscriber management functions of a BRAS, and extends traffic management to a per-subscriber/per-application level. It also exposes some of these functions in a generic state machine so that customized applications may be built on top of these. The service management engine software is the top most functional layer in the system. It uses features provided by the lower layers; it guarantees certain level of quality of service for services and applications under management; and it provides visibility into the traffic stream for the network operators.

The Service Management Engine is the runtime layer of Services Management Software Environment. It may be divided into three major functional areas: Bandwidth Management, Service Management, and Application Scripting. The Bandwidth Management area is concerned with per-subscriber/per-service traffic management; the Service Management area is concerned with classifying flows and following protocol negotiations; and the Application Scripting area is concerned with providing capability to script custom network-based application services.

Figure 12:
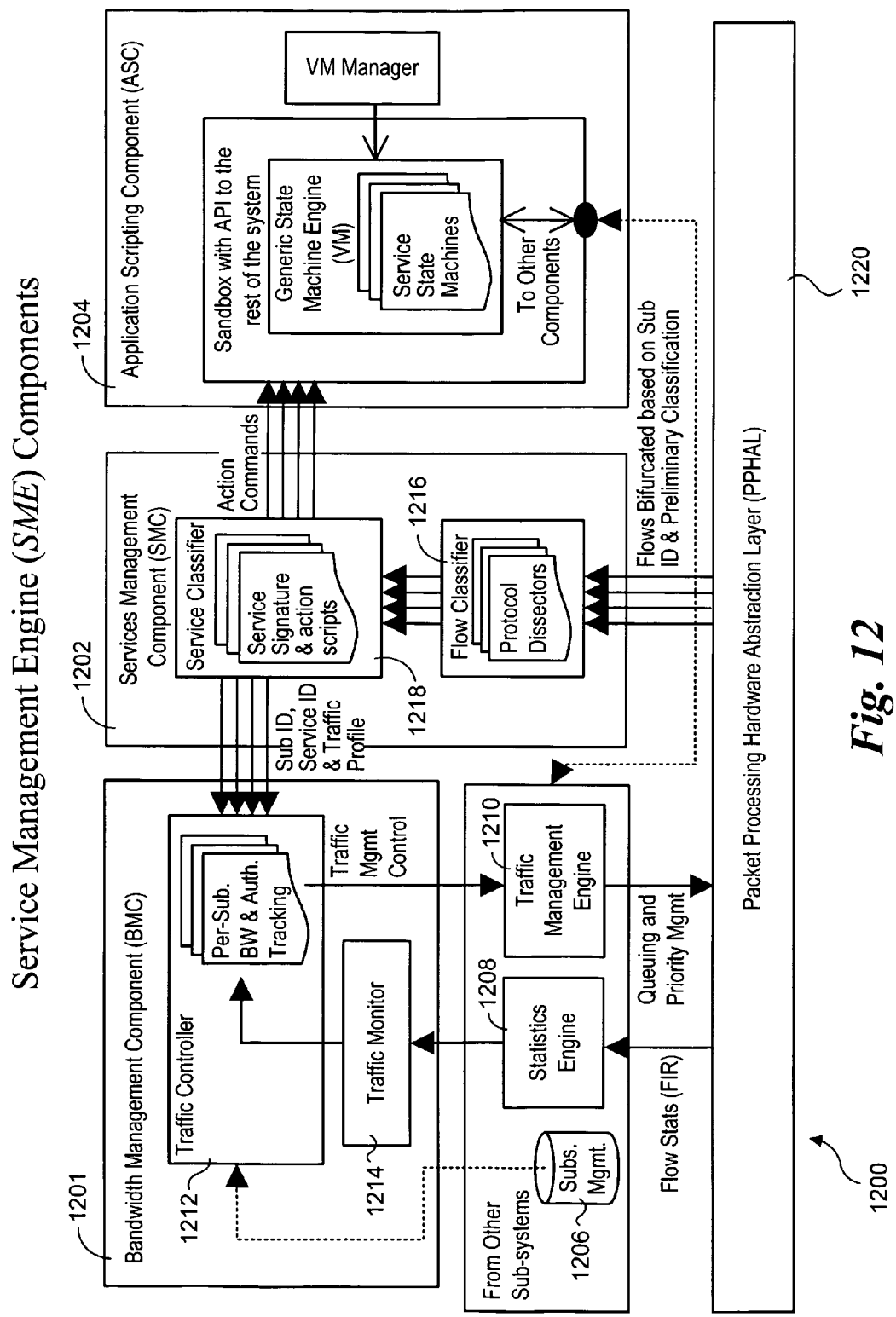
FIG. 12 is a schematic diagram illustrating various components associated with a Service Management Engine (SME)

FIG. 12 shows the major components of the SME, and their interactions. Some components are shown in more detail, while external components such as subscriber management, traffic management, and the global arbitrator are not shown for clarity. FIG. 12 also does not show the internal layering of the components.

The SME consists of three major abstract components: Bandwidth Management component (BMC) 1201, a Services Management component (SMC) 1202, and an Application Scripting Component (ASC) 1204. The BMC 1201 is responsible for tracking per-subscriber usage statistic and traffic authorization and admission. The SMC 1202 is responsible for classification of flows, dissection of packets, and correlation of flows to services. The ASC 1204 runs sandboxes in which scripts may be executed.

The Bandwidth Management Component 1201 depends on a Subscriber Management Subsystem (SMS) (which provides subscriber information 1206), a Statistics Engine 1208, as well as a Traffic Management Engine (TME) 1210 for operation. The BMC receives correlated traffic and flow statistics on a per-subscriber and per-port/circuit basis from Statistics Engine 1208. It runs a per-subscriber state machine that keeps track of subscriber authorization, bandwidth consumption, and service utilization. It also receives service classification information from Service Management Component 1202, and computes traffic management policies on a per-flow basis. These policies are then sent to the TME 1210 for execution. To facilitate these operations, BMC 1201 includes a Bandwidth Controller 1212, and a Traffic Monitor 1214

The Services Management Component 1202, on the other hand, supplies the protocol and service classification information to Bandwidth Management Component 1201. It receives pre-classified packet flows that are bifurcated from the ingress traffic blade; it classifies each flow by their application level protocol; it dissects packets from interested flows in order to get application level messages; finally, it correlates flows to services, and sends the service classification and traffic specification of flows to BMC and other interested listeners. These operations are facilitated by a Flow Classifier 1216 and a Service Classifier 1218.

The Application Scripting Component 1204 implements a sandbox where "application scripts" may be executed in virtual machines. This component provides an API and an execution environment similar to what is available to the Bandwidth Management Component. In addition, Service Definition Scripts may direct specific messages to a particular application script. Application Scripts may implement custom application state machines, or security and traffic management policies. Each script has its dedicated environment.

Subscriber provisioning is handled at the subscriber management system, the detail of which is beyond the scope of this specification. In one embodiment, each subscriber is provisioned with a list of services; and each service is tagged with a service class: Best Effort, Managed, or Preferred. After subscribers are authenticated, their lists are brought to the network element as part of the authorization process. Each subscriber will be assigned to a compute-node, and the authorization will be made available to the Bandwidth Management Component residing on that compute node.

Profiles of services are provisioned at the management layer of SMC 1202. They are provisioned in the form of Service Definition Scripts. A Service Definition specifies what protocols a service uses, how a service is matched, what values are expected in the service's control protocol negotiations, the traffic profile of the data streams, and the control actions to be taken when this services is detected. These profiles are stored in a service node's persistent file system. The SMC uses these profiles to match flows to services, and obtain their traffic profiles, which are delivered to the BMC 1201.

Similarly, Application Scripts are provisioned at the management layer of ASC 1204. They are stored in a service node's persistent file system, and are loaded into their sandboxes at startup time.

As discussed above, the Service Node platform architecture employs a substantial level of parallelism, as provided by multiple Compute and Traffic Blades. External entities, such as subscriber provisioning and AAA (Authentication, Authorization, and Accounting), the Statistics Engine 1208, and the Traffic Management Engine 1210 are run in their own processes. The SME spreads itself along component boundaries. The Bandwidth Management Component will have its own process; so is the Service Management Component. The Application Scripting component will have a sandbox process from which all application scripts run.

Each compute-node that is not reserved for OAMP functions will have a full set of SME processes, including one BMC process, one SMC process, and one ASC process. Each of these processes is also multithreaded as described below. A compute-node is responsible for a number of subscribers. All processing, analysis and computation done for, or on behalf of, these subscribers are conducted on this compute-node. The Global Arbitrator 1100 has the responsibility to allocate subscribers to compute-nodes when they are authenticated.

In addition to these processes that run on compute-nodes, the Service Management Component offloads some of its tasks, such as IP reassembly and preliminary classification, to a process on the host processor on Traffic Blades 600. This process may run these tasks directly, or act as a proxy for the ASIC/FPGA array. Moreover, SME has a configuration management (CM) process that implements the management layer functions.

To take advantage of the SMP nature of the compute-nodes and the host processors, the foregoing processes are multithreaded. In addition to threads that handle various housekeeping duties, each of BMC 1201 and SMC 1202 employ several threads that drain their work queues. The BMC employs two or more "worker threads", each of which is responsible for a (disjoint) subset of subscribers that are assigned to a particular BMC instance. The IPC servicing thread of a BMC will sort messages for different subscribers into different work queues based on their subscriber identification. Similarly, the SMC employs two or more threads that process incoming packets. The division of labor between threads is defined on a per-flow basis. The specific number of worker threads per process will be decided based on processor utilization data after profiling the processes with experimental data load. The ASC, on the other hand, employs one master thread, and at least one worker threads per application script. The ASC virtual machines have facilities to allow application scripts to spawn more threads when desired.

Not withstanding the fact that these processes are multithreaded, their operations are driven by messages (IPC) they receive. The SMC receives pre-classified datagrams from the packet processing HAL 1220; these datagrams are packed in IPC messages with extra headers. The worker threads of SMC 1202 will run flow classifiers, packet dissectors, as well as service classifiers on these messages and, in turn, produce "application level messages" for those services identified. These messages are then delivered to BMC 1201. The BMC's worker threads are driven with these messages; they produce traffic management directives for Traffic Management Engine 1210. The ASC 1204 worker threads are driven, similarly, with messages from SMC 1202 and other parts of the system.

There are four classes of provision-able information: subscriber authorization, protocol description, service definition, and application scripts. As discussed earlier, subscriber authorization is provisioned in the Subscriber Management Subsystem. This information is provisioned statically, either on the node or in an external database. It is retrieved when a subscriber authenticates; and it is made available to the rest of the system software through sharing of the embedded provisioning information database. Each subscriber's authorization data includes a list of names of services, as well as their access class, namely "guaranteed", "managed" or "best effort" in one embodiment.

However, subscribers are assigned to instances of SME dynamically. As discussed above, each compute-node that does not serve the OAMP function will have an instance of SME with all of its components. Each instance is responsible for a number of subscribers. The list of subscribers served by a particular compute-node, or SME instance, is decided by the Global Arbitrator 1100 when subscribers authenticate. The decision is based on available compute resources on all available compute-nodes.

The protocol descriptions are provisioned as binary loadable modules that are loaded into SMC 1202. The SMC has descriptions of a number of protocols built-in, while descriptions of extra protocols are loaded as protocol dissector plug-in modules. When an instance of SMC 1202 is started, all protocol definitions, including the provisioned ones, are loaded automatically. These definitions may be de-provisioned by user request, provided that no other protocol or service definitions depend on them.

The service definitions are provisioned as clear text scripts. These definitions are provisioned at the management layer of SMC 1202, and saved in a persistent file system. Each SMC instance loads the complete list of provisioned service definitions when it starts. These definitions may be de-provisioned at any time.

Similarly, application scripts are provisioned at the management layer of ASC 1204 and stored in the persistent file system. The scripts are loaded into the ASC process by the master thread on each compute-node when the embedded software for that node is started. They may be de-provisioned and unloaded at any time.

In addition to the above, the SME provisions the Traffic Management Engine dynamically. The SME, specifically the BMC, computes traffic management policies on the fly based on subscribers' authorization and real-time traffic condition. These policies are sent to the TMC for enforcement One "application" provided by the SME is bandwidth management. This is performed by assigning classes of service to flows based on their classification and the authorization of the subscriber to whom they belong. The SME relies on Subscriber Management Subsystem 1206 for subscriber authorization information, on Statistics Engine 1208 for circuit and flow level statistics, and on Traffic Management Engine 1210 for traffic management policy enforcement.

Figure 13:
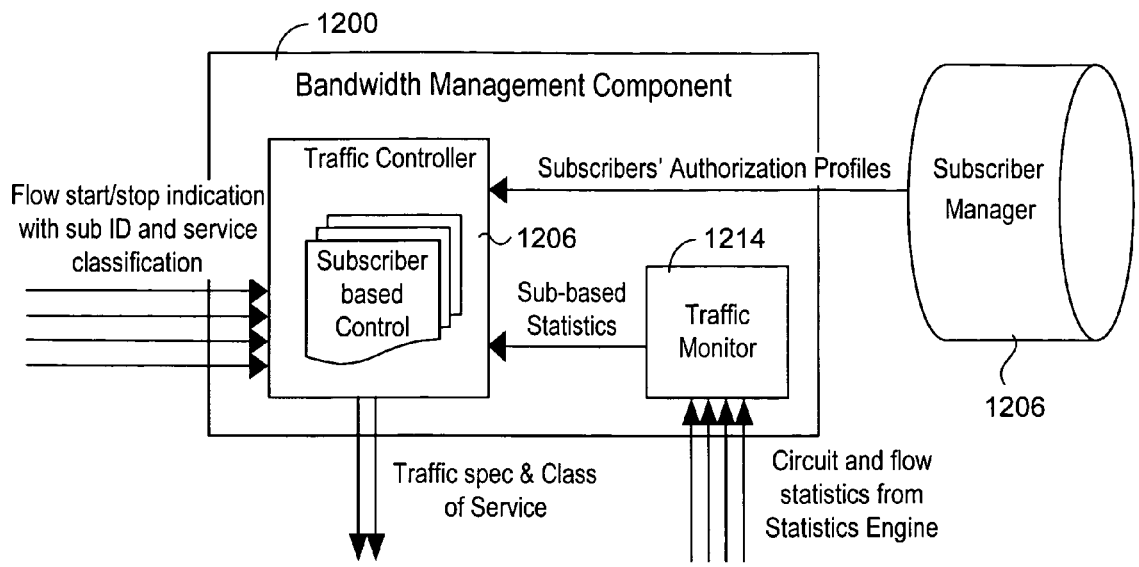
FIG. 13 is a schematic diagram illustrating details of the Bandwidth Management Component of the SME components of FIG. 12.

As shown in FIG. 13 and discussed above, a BMC employs a Traffic Monitor 1214 and a Traffic Controller 1212. The Traffic Monitor interfaces with Statistics Engine 1208 to monitor network traffic. For network interfaces that face the core side, the Traffic Monitor aggregates traffic statistics on a per-port or per-circuit basis. On subscriber facing interfaces, however, the Traffic Monitor aggregates statistics on per-destination or per-subscriber basis. Core-side monitoring provides information for admission control when new service is initiated. Subscriber-side monitoring helps to determine how much bandwidth and throughput any given subscriber is using. Together with their allotted bandwidth and throughput authorization, this information is taken as an input for deciding the class of service a new flow receives. In addition, flow-based statistics on selected flows are monitored for verifying the QoS a particular flow experiences.

The Traffic Controller 1212 computes traffic management policies on a per flow basis. It runs a "traffic state tracking machine" for each subscriber under its management. It has access to subscriber authorization information, including service profiles, and provisioned bandwidth and throughput. It receives classification and traffic profile information for detected or expected flows of recognized network applications (services) from Service Management Component 1202. It then validates whether there is enough bandwidth on the subscriber's line to accommodate it.

The Traffic Controller's primary focus is to decide the class of service for a given flow and a given subscriber. If a flow is of a guaranteed service, and there is enough bandwidth, given the flow's traffic profile and the available bandwidth of the subscriber's line, then the flow will be admitted to the guaranteed class. Queues for other classes of traffic are adjusted, as necessary, to accommodate this flow. Otherwise, the flow will be added to the best-effort class. An alarm indication may be raised in this situation. Regardless of service classes, policing, shaping, and priority parameters are setup for all flows to protect them from each other, and to protect service level agreements for all subscribers.

Figure 14:
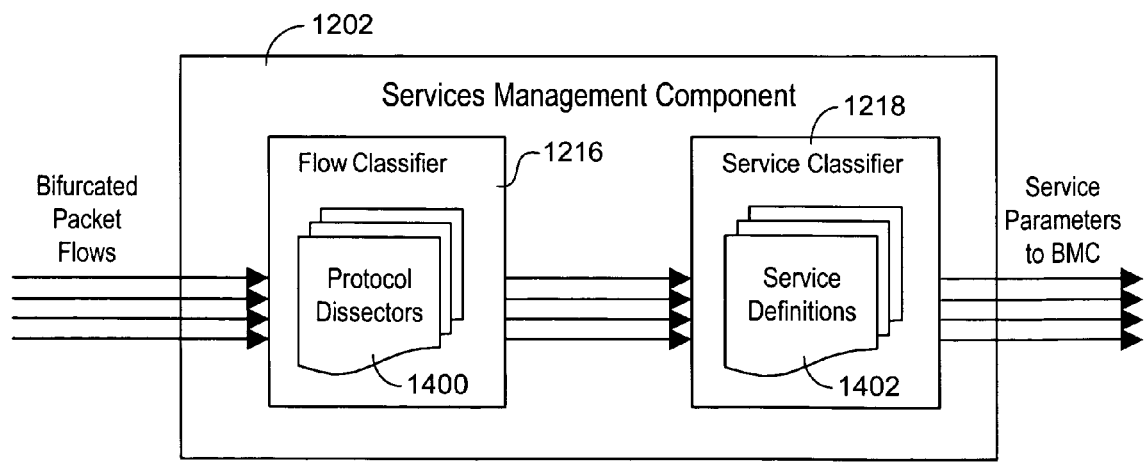
FIG. 14 is a schematic diagram illustrating details of the Services Management Component of the SME components of FIG. 12.

The Services Management Component 1202 is responsible for identifying and monitoring services. As shown in FIGS. 12 and 14, the SMC receives bifurcated flows of packets from the Packet Processing HAL (Hardware Abstraction Layer) 1220 (PPHAL), classifies the flows according to the protocol they use, dissects the packets into application level messages, and matches flows to known "services". Once a service is identified, SMC 1202 sends a notification with flow identification and classification information, as well as traffic profile to the BMC instance on the same compute-node. This notification may include a Flow Information Record (FIR) that contains various flow statistics.

Initially, no traffic (for an associated flow) is bifurcated. When a subscriber is authenticated and assigned to a compute-node, its authorization list is analyzed at the BMC instance on that node. If the subscriber subscribes to any service that is being supported, the BMC instance will contact the SMC instance on the same compute-node, which, in turn, will instruct PPHAL 1220 to bifurcate traffic belonging to this subscriber to this node. If a subscriber is not authorized to use any "service," then no bifurcation is needed. For authorized subscribers, SMC 1202 will attempt to classify as much traffic as possible, and discard packets that it can not process. Once a classification decision is made for a particular flow, SMC 1202 will determine whether it needs to receive more packets from this flow. It is expected that only control flows need constant monitoring in SMC. High bandwidth flows, such as media flows, only need to be classified and never looked at again.

The Services Management Component can be broken down to two parts: the Flow Classifier 1216 and the Service Classifier 1218. The Flow Classifier, as its name suggests, is responsible for classification of packet flows. It runs a set of Packet Dissection Plug-in modules (Packet Dissectors). A Pre-Classifier in PPHAL 1220 filters out flows that are not of interest to the SMC, and only bifurcate flows belonging to subscribers who are assigned to a particular instance of SMC to that instance of SMC. The SMC is responsible to provision classification rules to the PPHAL so that only flows that are potentially interesting are bifurcated; the BMC, however, is responsible for notifying the SMC, which, in turn, registers with PPHAL of subscribers that are to be monitored by a particular instance of SMC.

For every packet it encounters, the Service Classifier performs deep packet inspection by running through its protocol dissectors 1400. Each protocol dissector assigns a percentage probability of a packet being of its associated protocol. At the end, the protocol with the highest probability wins. Some flows, however, may not be classified successfully: all dissectors may report very low probability. Accordingly, unclassified flows will be lumped into an "unclassified" pool. For management purposes, they will only be distinguishable by their flow ID. The classified flows are dissected into application level messages and passed to Service Classifier 1218 for further analysis.

The Service Classifier correlates classified and dissected packet flows as services. Services are defined by Service Definitions 1402. A Service Definition describes how a service is recognized, its traffic profile, and what actions to take when such a service is detected. Service Classifier 1218 reads in all available service definitions at startup time, and builds an internal data structure for service classification. Additional service definitions may be loaded at runtime. When service definitions are added or removed, this internal data structure is amended dynamically.

The "actions" specified in these definitions are primitives that the SME supports. The most common one (and the default) is the send command. A service definition may request the traffic profile and the flow information record be sent to other components including, but not limited to, BMC 1201. A service definition may be used, for example, to send information to Application Scripts running in a sandbox.

The Service Management Component maintains one FIR for each flow it monitors. Protocol classification and service classification results are recorded in these Flow Information records. FIRs are used when communicating classification information with other components.

The SMC 1202 relies on PPHAL 1220 to deliver bifurcated flows of packets to the correct instance of the software. As discussed earlier, when a subscriber is authenticated, it is assigned to a particular compute-node, and a particular instance of the SMC software. In addition, a backup instance may be specified at the same time by Global Arbitrator 1100. This assignment is communicated to PPHAL 1220, and it is the responsibility of the PPHAL to deliver bifurcated packets to the correct instance of the software. Moreover, SMC 1202 will instruct PPHAL 1220 to stop bifurcation of certain flows when enough information has been obtained from packet inspection. The main communication method for delivering bifurcated packets from PPHAL 1220 to SMC 1202 will be IPC, using the "push" model. However, the communication channel from SMC 1202 to PPHAL 1220 for control messaging will use RPC (Remote Procedure Call).

The primary client of SMC 1202 is the Bandwidth Management Component 1201. A BMC instance notifies the SMC instance on the same compute-node the set of subscribers who are under its management. The SMC instance, in turn, registers with PPHAL 1220 to receive bifurcated packets from these subscribers. Once a flow is dissected and classified, SMC 1202 sends the classification result and traffic profile to BMC 1201 for policy decision rendering. The API from BMC to SMC comprises an RPC interface; whereas the interface from SMC to BMC will use IPC. As there is no shared data, no locking is necessary.

The Application Scripting Component 1204 is client of SMC 1202, and is very similar to BMC 1201. The ASC receives copies of IPC events that are sent to BMC 1201. However, it does not provision SMC 1202 as does BMC 1201.

Last, but not the least, SMC 1202 couples with a configuration manager (CM) in the Management Layer (not shown). The configuration manager resides on a compute-node that is dedicated for OAMP functions. They communicate via the provisioning database. While the configuration manager has write access to the provisioning information database, SMC only has read access. Multiple instances of SMC may share read locks on the same record set in this database.

The Application Scripting Component 1204 implements a sandbox where "application scripts" may be executed in virtual machines. The ASC provides an API and an execution environment similar to what is available to BMC 1201 In addition, Service Definition Scripts may direct specific messages to a particular application script. Application Scripts may implement custom application state machines or security and traffic management policies. Each script has its dedicated environment. This is where network-based applications can be hosted on the service node.

Figure 15:
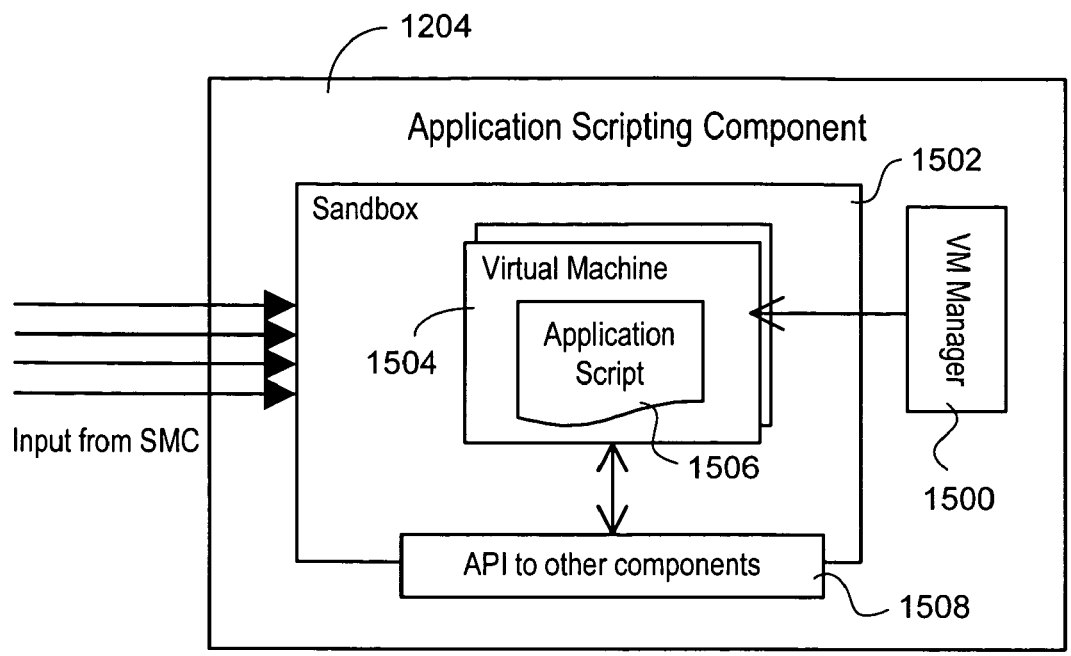
FIG. 15 is a schematic diagram illustrating details of the Application Scripting Component of the SME components of FIG. 12.

As shown in FIG. 15, there are two major sub-components in ACS 1204 subsystem: a Virtual Machine Manager (VMM) 1500, and a sandbox 1502 that supports all virtual machines 1504. VMM 1500 is responsible for setting up the sandbox, and starting all virtual machines that run application scripts. For every application script, a separate virtual machine 1504 is started. The VMM monitors virtual machines that it starts, and restarts them if they crash.

Sandbox 1502 an execution environment for generic state machine engines (see FIG. 12) (or virtual machines) which, in turn, run Application Scripts 1506. The sandbox delivers events from other parts of the system to the virtual machines; in addition, it provides guarded access to a selected API 1508 for access resources and runtime information available on the network element.

The virtual machines comprise generic state machine engines. In respective embodiments they may be implemented as Mono or Java virtual machines with specific class libraries. In one embodiment, the sandbox is built with a Common Language Runtime (CLR) that is based on Mono with a custom-built Just-In-Time compiler to execute the Common Intermediate Language (CIL) byte code. The generic state machines may be implemented as "application domains" within the sandbox.

In addition to standard class libraries, a set of proprietary class libraries is available. These class libraries provide the event mechanism as well as API 1508 to the rest of the system. Application scripts have access to flow information, statistics, as well as classification results from SMC 1202. They may be granted other access to components such as Traffic Management and Subscriber Management, depending on their intended application.

The Application Scripts 1506, are in the form of CIL packages known as "assemblies." An application service developer may use any language for which a compiler with a backend for generating CIL byte code is available. The preferred language is C#. Each Application Script 1506 is loaded into a separate application domain in the CLR. The Application Scripts have access to system information and resources similar to those available to BMC 1201; however, they are not allowed to interact with each other for security reasons.

As discussed above, the various resources that are employed for handling a given flow may be (generally) located anywhere within the service node, thus supporting various capabilities, such as full scalability and failover. However, specific resources are assigned for handling particular flows based on the subscriber and possibly other considerations, such as application (e.g., VoIP, VoD, etc.).

Figure 16:
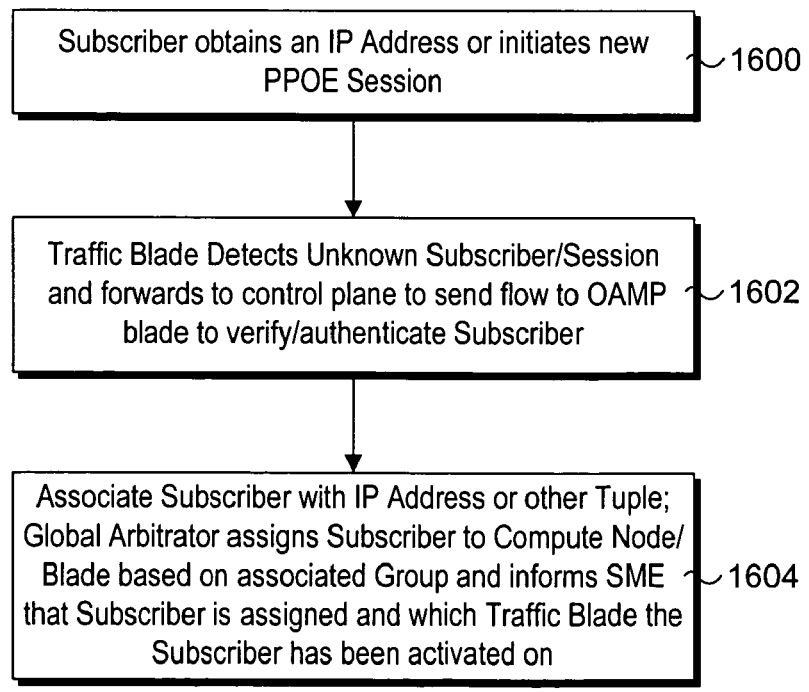
FIG. 16 is a flowchart illustrating operations employed to provision compute resources for an associated subscriber flow.

In further detail, reference is made to FIG. 16, which illustrates operations that are employed to provision a new flow. The process begins in a block 1600, wherein a subscriber attempts to obtain a IP address or initiates a PPOE Session. Typically, each ingress Traffic Blades will provide a set of one or more input ports via which input traffic is received by the service node, such that a particular flow received from a given subscriber will be received by a particular Traffic Blade. In response to receiving a packet at a block 1602, that Traffic Blade will perform a preliminary inspection to identify the subscriber or subscriber session (e.g., a given subscriber may have multiple sessions open at the same time, including sessions having different applications). Since this is a new flow, it has yet to be assigned, which will be identified by the Traffic Blade. More specifically, the Traffic Blade NPU will have access to a distributed runtime database containing flow assignments based on some filtering criteria (e.g., 5-Tuple signature), whereby the NPU can determine the assignment for a flow using a database lookup. In the case of a new flow, this is result in a miss, and the NPU will forward the processing to the control plane and send the flow to an OAMP blade to verify and/or authenticate the subscriber. Flow example, subscriber authentication may be performed using one of many well-known authentication schemes, such as an AAA server.

Once the subscriber is authenticated, the process moves to a block 1604, wherein the subscriber will be associated with an IP address or other Tuple, with the association being stored as a record in the runtime database. The global arbitrator then assigns the subscriber to a compute node/blade based on a combination of criteria, including the group associated with the subscriber/application and dynamic considerations, such as discussed above (e.g., load balancing, etc.) The global arbitrator further informs the SME that the subscriber has been assigned to the compute node/blade and which Traffic Blade the subscriber has been activated on. These associations and assignments enables packets received at an ingress Traffic Blade to be sent to particular processing resources for further processing during on-going flow operations, as follows.

Figure 17:
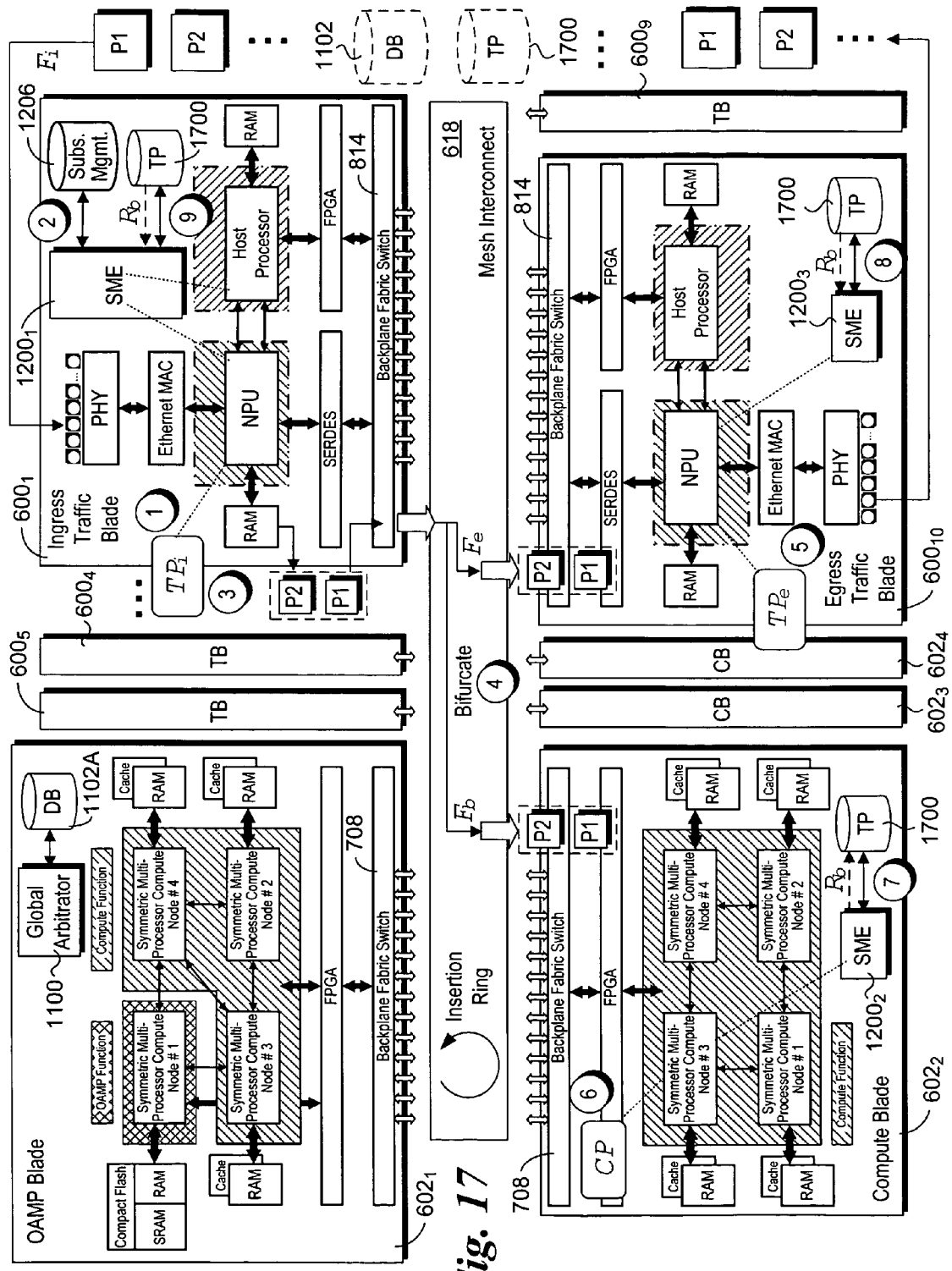
FIG. 17 is a schematic diagram of an exemplary execution environment for a service node used in connection with the packet processing operations of FIG. 18.

In order to better understand aspects of the packet processing, an exemplary service node environment is shown in FIG. 17. As discussed above with reference to FIG. 10, this environment employs a fully-populated ATCA chassis including 10 Traffic Blades $600_{1-10}$, and 4 Compute Blades $602_{1-4}$, with Compute Blade 602, being provisioned as to support OAMP functions. Each of the Traffic and Compute Blades are communicatively-coupled via mesh interconnect 618, with access to the interconnect being managed by the backplane fabric switch on each blade.

In general, a global arbitrator 1100 instance will run on each blade, as exemplified by OAMP blade $602_1$. For simplicity and clarity, other global arbitrators are not shown. Additionally, various SME component instances will be run on the various blades. For simplicity and clarity, these SME component instances are schematically depicted as SME instances $1200_{1-3}$. It will be understood that the actual SME component instances will include instances of SME components applicable to the respective execution host (i.e., each of the Traffic Blades $600_{1-10}$ and Compute Blades $602_{1-4}$ will run instances of associated SME components).

Figure 18:
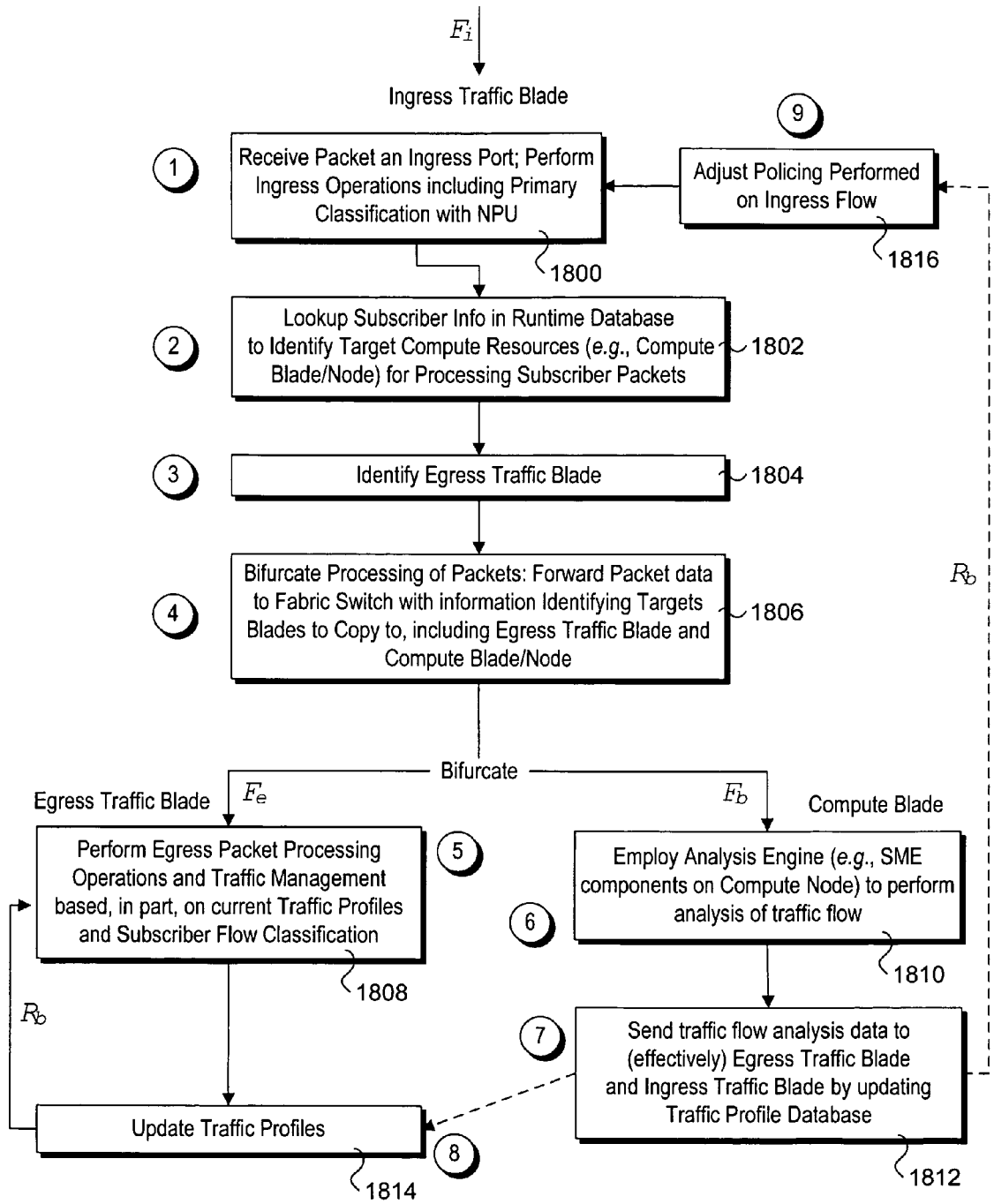
FIG. 18 is a flowchart illustrating operations performed in connection with processing a packet flow, according to one embodiment of the invention.

Referring now to FIGS. 5, 17, and 18, the on-going flow operations begin at a block 1800 in FIG. 18, wherein a packet (flow) is received at an ingress port. In further detail, an ingress packet flow $F_i$ (depicted as packets P1 and P2) is received at an input port of an ingress Traffic Blade 600₁. Upon receiving each packet, ingress operations including primary classification is performed by the Ingress Traffic Blade's NPU, which functions as an Ingress Traffic Processor $TP_i$ of FIG. 5. For example, in one embodiment a 5-Tuple Signature match is used. Other classification schemes may also be employed in a similar manner. The purpose of the classification is to associate the packets with a subscriber flow.

After the primary classification is performed, subscriber information is retrieved from a runtime database (e.g., Subscriber Management DB 1206) to identify the compute resources that will be employed to process the subscriber flow. As discussed above, this information (i.e., subscriber-to-resource mapping) is generated in block 1604 of FIG. 16. In the illustrated example, the compute resource comprises Compute Node #3 on compute blade 6002.

In conjunction with the operations of block 1802 the Ingress Traffic Blade also identifies the Egress Traffic Blade to which the packet is to be sent for Egress processing. In the illustrated example, this comprises Egress Traffic Blade 600$_{10}$, which also functions as Egress Traffic Processor TP$_e$ of FIG. 5.

Continuing at a block 1806, at this point the processing of the packet is bifurcated. This aspect involves two primary operations: copy the packet to each target processor, and perform respective sets of packet processing operations on those target processors. The copy operation is accomplished in the following manner. First, the packet is copied from its NPU buffer (e.g., local RAM) into the backplane fabric switch 814 of Ingress Traffic Blade 600$_1$. Along with copying the packet, information is provided to the backplane fabric switch to instruct the switch to which target blades the packet is to be copied to. In one embodiment, the backplane fabric switches 814 and 708 implement a insertion ring scheme, under which certain cross-connections exist for each transmit "cycle." A bit mask or the like is used to identify which blade(s) is/are targeted to receive a copy of the data, based on the slot address of the blade. During a given cycle, the backplane fabric switch of a given blade determines if there is an interconnect from itself to the backplane fabric switch on another blade for which request for a data transfer is pending. If so, the data is transmitted during that cycle; otherwise the backplane fabric switch waits for the next cycle. Meanwhile, the data is held in a fabric switch buffer until all copies of the data have been transmitted.

This scheme provides several advantages over conventional copy schemes. Under a typical scheme, a processor or the like is employed for each copy. In addition, an interconnect path may not be immediately available, especially under a priority-based fabric switch scheme. Each of these may consume additional processor resources, which in turn may introduce jitter an/or delay. In contrast, under the insertion ring discussed herein, there is no jitter or delay introduced to the packet processing.

As discussed above with reference to FIG. 5, the flow to the Egress Traffic Blade (the egress flow) is termed F$_e$, while the bifurcated flow to the Compute Blade is termed F$_b$. For packets corresponding to egress flow F$_e$, egress packet processing operations are performed in a block 1808. This typically involves assigning the packet to an associated flow queue and appending the packet to that flow queue. Other ongoing traffic management and shaping processes may be employed for dispatching the flow queues for transmission to a next hop in the network, such as employed by round robin and priority-based dispatch schemes.

In connection with these operations, the flow queue assignment is based, in part, on current traffic profiles and subscriber flow attributes such as flow application. For example, in one embodiment flow queues are dispatched using a priority-based scheme, with flows associated with higher QoS, for example, receiving higher priority. In addition, the availability of queue dispatch (and corresponding queue assignments) may be managed in view of current traffic profiles. Accordingly, the assignment of a subscriber flow packet into a dispatch queue is a dynamic consideration that may change over time in view of changes in traffic profiles and the like.

In parallel with the egress traffic operations of block 1808, the Analysis Engine of FIG. 5 is employed to perform analysis of the traffic flow in a block 1810. As applied to the execution environment of FIG. 17, the Analysis Engine functions are effected via corresponding SME component instances in the manner described above and as represented by SME instance 1200$_2$.

Continuing at a block 1812, the Analysis Engine generates traffic profile information that is provided to each of the Ingress and Egress Traffic Blades to update there traffic profile information. In view of the SME architecture, this result can be effected by updating a local instance of a distributed Traffic Profile (TP) database 1800 with the new traffic profile information. Using a distributed database update mechanism, the updated traffic profile information is propagated to each local instance of the Traffic Profile database, thereby effectively providing the updated traffic profile information to Egress Traffic Blade 600$_{10}$, as depicted by the update Traffic Profiles operation of block 1814.

With respect to feedback to the Ingress Traffic Blade, the traffic analysis information generated in block 1810 may be used to adjusting policing operations performed on the ingress flow, as shown in a block 1816. This provides a means by which an Ingress Traffic Blade can dynamically adjust its ingress processing operations for a given flow in view of real-time traffic analysis feedback derived from that flow.

As discussed above, various operations performed by the service node are implemented via execution of software (e.g., machine instructions and/or virtual machine code) on processing elements. Thus, embodiments of this invention may be used as or to support software embodied as programs, modules, libraries, etc., executed upon some form of processing core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
   receiving packets comprising an ingress traffic flow at an ingress traffic processor of a network element;
   performing a first level of classification on the ingress traffic flow at the ingress traffic processor to identify an egress traffic processor and a computation processor for the packets;

bifurcating processing of the packets to the egress traffic processor and the computation processor;

performing egress traffic flow operations at the egress traffic processor, the egress traffic flow operations assigning the packets to an egress traffic flow;

performing a second level of classification on the packets at the computation processor; and performing traffic analysis operations at the computation processor to generate traffic analysis data corresponding to the ingress traffic flow.

2. The method of claim 1, wherein the operation of bifurcating processing of the packets introduces no additional latency into the processing of the ingress or egress traffic flows.

3. The method of claim 1, further comprising:
receiving packets corresponding to multiple ingress traffic flows at the network element; and
assigning packets associated with multiple ingress traffic flows to egress traffic flows in view of traffic profiles generated from the traffic analysis data for the multiple ingress traffic flows.

4. The method of claim 1, further comprising:
maintaining flow state information for the ingress traffic flow; and
altering traffic analysis operations in view of the flow state information.

5. The method of claim 1, further comprising:
dynamically adjusting an egress traffic profile applied to the egress traffic flow in view of the ingress traffic flow traffic analysis data that is generated.

6. The method of claim 1, wherein the network element comprises a modular chassis including a plurality of traffic blades and compute blades, the method further comprising:
receiving the packets at an ingress traffic blade;
performing primary classification of the packets to identify a subscriber flow associated with the packets; and
based on the subscriber flow,
identifying an egress traffic blade to be employed for the egress traffic flow operations and sending a first copy of the packets to that egress traffic blade; and
identifying a computation blade to be employed for the traffic analysis operations and sending a second copy of the packets to that compute blade.

7. The method of claim 6, further comprising:
detecting initiation of a subscriber session;
storing data associating traffic blade and computation resources with a subscriber flow corresponding to the subscriber session.

8. The method of claim 7, wherein a compute blade includes multiple compute nodes, and associating computation resources with the subscriber flow identifies a compute node on a compute blade to be employed for performing traffic analysis operations.

9. The method of claim 6, wherein the copying the first and second packets to the egress traffic blade and compute blade comprises:
buffering packets received at the ingress traffic blade in a backplane fabric switch of the ingress traffic blade;
transmitting the first copy of the packets across a mesh interconnect to a backplane fabric switch of the egress traffic blade; and
transmitting the second copy of the packets across the mesh interconnect to a backplane fabric switch of the compute blade.

10. The method of claim 9, wherein the backplane fabric switches employ an insertion ring transfer scheme to transfer a copy of a packet buffered in the backplane fabric switch of the ingress traffic blades to target egress traffic and compute blades.

11. The method of claim 6, wherein the primary classification operation comprises performing a 5-Tuple classification.

12. The method of claim 1, further comprising:
providing the generated traffic flow analysis data to the ingress processor;
and adjusting policing performed on the ingress traffic flow in view of the traffic flow analysis data.

13. The method of claim 1, further comprising:
performing classification of the packets to classify the ingress traffic flow as a particular application traffic type.

14. The method of claim 13, further comprising:
employing deep packet inspection to classify the ingress traffic flow.

15. An apparatus, comprising:
a plurality of ingress traffic processors;
a plurality of egress traffic processors, communicatively coupled to the ingress traffic processors;
a plurality of computation processors, communicatively coupled to the ingress and egress traffic processors; and
software components distributed across the plurality of ingress traffic processors, egress traffic processors and computation processors, the software components to execute on the plurality of ingress traffic processors, egress traffic processors and computation processors to perform operations including:
performing ingress processing operations on packets comprising an ingress traffic flow received at the apparatus;
bifurcating processing of the packets to an egress traffic processor and a computation processor by providing copies of the packets to both the egress traffic processor and the computation processor;
performing egress traffic flow operations at the egress traffic processor, the egress traffic flow operations assigning the packets to an egress traffic flow; and
performing traffic analysis operations at the computation processor concurrently with the egress traffic flow operations, the traffic analysis operations generating traffic profile data corresponding to the ingress traffic flow.

16. The apparatus of claim 15, wherein execution of the software performs further operations comprising:
performing ingress processing operations on packets corresponding to multiple ingress traffic flows received at the apparatus;
maintaining flow state information for each of the multiple ingress traffic flows; and
altering traffic analysis operations in view of the flow state information.

17. The apparatus of claim 15, wherein execution of the software performs further operations comprising:
dynamically adjusting an egress traffic profile applied to the egress traffic flow in view of the ingress traffic flow traffic profile data that is generated.

18. The apparatus of claim 15, wherein execution of the software performs further operations comprising:
providing the generated traffic flow profile data to the ingress processor;
and adjusting policing performed on the ingress traffic flow in view of the traffic flow profile data.

19. The apparatus of claim 15, wherein execution of the software performs further operations comprising:

performing classification of the packets to classify the ingress traffic flow as a particular application traffic type.

20. The apparatus of claim 15, wherein execution of the software performs further operations comprising:
associating the ingress traffic flow with a subscriber flow;
identifying processing resources allocated to the subscriber flow, the processing resources including a target egress traffic processor and a target computation processor; and
bifurcating processing of the packets by transmitting a copy of each packet to each of the target egress traffic processor and the target computation processor.

21. An apparatus, comprising:
a chassis having a plurality of slots and including a backplane providing a mesh interconnect between the slots;
a plurality of traffic blades, each installed in the chassis in a respective slot and including a backplane interface coupled to the backplane, the plurality of traffic blades including ingress traffic blades and egress traffic blades;
a plurality of compute blades, each installed in the chassis in a respective slot and including a backplane interface coupled to the backplane; and
software components distributed across the plurality of traffic blades and compute blades, the software components to execute on processing elements hosted by the traffic blades and compute blades to perform operations including:
performing ingress processing for packets received at an ingress traffic blade, the ingress processing including performing primary classification of the packets to identify a subscriber flow associated with the packets;
based on the subscriber flow,
identifying an egress traffic blade to be employed for the egress traffic flow operations and sending a first copy of the packets to that egress traffic blade; and
identifying a compute blade to be employed for traffic analysis operations and sending a second copy of the packets to that compute blade,
performing egress traffic operations for the subscriber flow on the egress traffic blade using the first copy of packets; and
performing the traffic analysis operations on the compute blade using the second copy of packets.

22. The apparatus of claim 21, wherein a compute blade includes a plurality of computing elements organized as compute nodes, and execution of the software components perform further operations comprising:
identifying a compute node to be employed for traffic analysis operations;
sending a copy of the packets to that compute node; and
performing the traffic analysis operations, at least in part, on that compute node.

23. The apparatus of claim 21, wherein copying the first and second packets to the egress traffic blade and compute blade comprises:
buffering packets received at the ingress traffic blade in a backplane fabric switch of the ingress traffic blade;
transmitting the first copy of the packets across the mesh interconnect to a backplane fabric switch of the egress traffic blade; and
transmitting the second copy of the packets across the mesh interconnect to a backplane fabric switch of the compute blade.

24. The apparatus of claim 23, wherein the backplane fabric switches employ an insertion ring transfer scheme to transfer a copy of a packet buffered in the backplane fabric switch of the ingress traffic blades to target egress traffic and compute blades.

25. The apparatus of claim 21, wherein execution of the software performs further operations comprising:
generating traffic flow profile data via the traffic analysis operations;
providing the traffic flow profile data to the ingress traffic blade; and
adjusting policing performed on the subscriber flow in view of the traffic flow profile data.

26. The apparatus of claim 21, wherein execution of the software performs further operations comprising:
effecting a distributed traffic analysis database in which traffic analysis data is stored, the distributed traffic analysis database including local instances of the database hosted on respective traffic and compute blades;
updating a local instance of the traffic analysis database with traffic analysis data generated by its host blade; and
propagating the update to other local instances of the traffic analysis database hosted by other blades.

27. The apparatus of claim 21, wherein execution of the software performs further operations comprising:
performing classification of the packets to classify the subscriber flow as a particular application traffic type; and
managing egress flow operations corresponding to the subscriber flow based on its application traffic type.

28. The apparatus of claim 27, wherein an ingress traffic blade includes a network processor unit (NPU) and a host processor, and wherein classification of packets into particular application traffic types is performed by:
employing the NPU to perform a first level classification using the NPU; and
employing the host processor to perform at least one additional level of classification including deep packet inspection.

29. The apparatus of claim 21, wherein the chassis comprises an Advanced Telecommunication and Computing Architecture (ATCA) chassis.

30. The method of claim 1 wherein the second level of classification comprises classifying the packets based on an application level protocol.

* * * * *